US009696859B1

(12) United States Patent
Heller et al.

(10) Patent No.: US 9,696,859 B1
(45) Date of Patent: Jul. 4, 2017

(54) DETECTING TAP-BASED USER INPUT ON A MOBILE DEVICE BASED ON MOTION SENSOR DATA

(71) Applicant: Amazon Technologies, Inc., Reno, NV (US)

(72) Inventors: Geoffrey Scott Heller, Seattle, WA (US); Paul Aksenti Savastinuk, Shoreline, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 58 days.

(21) Appl. No.: 14/307,470

(22) Filed: Jun. 17, 2014

(51) Int. Cl.
*G06F 3/044* (2006.01)
*G06F 3/01* (2006.01)
*G06F 3/0488* (2013.01)

(52) U.S. Cl.
CPC .............. *G06F 3/044* (2013.01); *G06F 3/012* (2013.01); *G06F 3/0488* (2013.01)

(58) Field of Classification Search
None
See application file for complete search history.

(56) References Cited

U.S. PATENT DOCUMENTS

| 2010/0194682 | A1* | 8/2010 | Orr | G06F 3/04886 345/156 |
| 2011/0163950 | A1* | 7/2011 | Ye | G06F 3/0383 345/157 |
| 2012/0154292 | A1* | 6/2012 | Zhao | G06F 1/1626 345/173 |
| 2012/0200497 | A1* | 8/2012 | Nasiri | G06F 3/017 345/157 |
| 2013/0342469 | A1* | 12/2013 | Keeney | G06F 1/1694 345/173 |
| 2014/0168057 | A1* | 6/2014 | Ahuja | G06F 3/017 345/156 |

* cited by examiner

*Primary Examiner* — Patrick Edouard
*Assistant Examiner* — Matthew Yeung
(74) *Attorney, Agent, or Firm* — Polsinelli LLP

(57) ABSTRACT

A computing device can detect first and second device motions within a first time period. The first and second device motions may be separated by a second time period. The computing device can determine that the second time period is within a specified time range. The computing device can determine that first and second motion metrics for the first and second device motions, respectively, are likely indicative of first and second taps, respectively, on a surface of the computing device. The computing device can determine that a first coordinate frame of the computing device associated with the first tap is within a range of angular degrees from a second coordinate frame of the computing device associated with the second tap. The computing device can further determine the first tap and the second tap as part of a double tap gesture.

19 Claims, 17 Drawing Sheets

DETECTING TAP-BASED USER INPUT ON A MOBILE DEVICE BASED ON MOTION SENSOR DATA

BACKGROUND

Computing systems have traditionally employed the use of a mechanical switch to detect user selection and input. On mobile devices, a touch sensor can be used in addition to the mechanical switch for detecting taps on a touch screen of a mobile device. However, the switch and sensor do not provide a way to detect taps on a back surface or a side surface of the mobile device. As computing systems become adaptable for varying types of user input, distinguishing a user's intentional input from other types of input using the switch and/or sensor with a latency low enough to support an interactive system poses increasing challenges.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to detecting user input on a mobile device. The term "mobile device" may be a type of computing device, and the terms are interchangeably employed in the present disclosure.

Figure 1B:
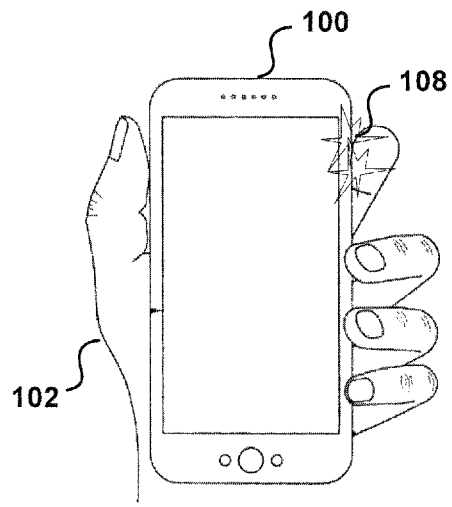
FIGS. 1A and 1B illustrate examples of a user performing an input gesture on a computing device, according to certain aspects of the subject technology.
Figure 1A:
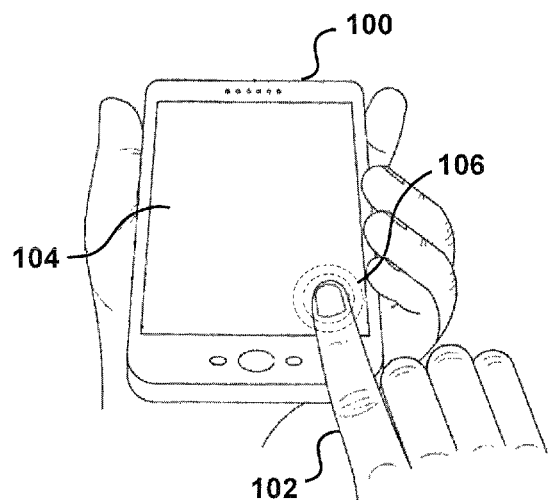

FIG. 1A illustrates a user 102 performing a touch gesture 106 on a front surface of a computing device 100 (e.g., a touch-based display screen 104). In some embodiments, the user 102 operating the computing device 100 can initiate an input function (e.g., a selection, text entry, or voice entry) by performing the touch gesture 106 on the front of the computing device 100. The touch gesture 106 involves the user 102 making contact with the front of the computing device 100 using an implement, e.g., a finger. The drawback with touching the front of the computing device 100 is that at least a portion of the display screen 104 is obscured by the finger. In this respect, the obscurity of content and/or information presented on the front of the computing device 100, caused by the user 102 having to touch the display screen 104, diminishes the user's experience with the computing device 100.

In particular, various embodiments of the present disclosure can provide a method of detecting tap-based user input on the computing device 100. In contrast to a typical touch-based user input, for example, the detection of tap-based user input provides an approach to detect taps, provided by the user 102, on the back and/or sides of the computing device 100 using at least one motion sensor (e.g., by itself or in combination with other types of touch input components). There may be multiple types of sensors that are potentially useful on mobile devices for this type of detection (e.g., an accelerometer, a gyroscope, magnetic proximity sensor, light-based proximity sensor, and a microphone, among others)). The microphone may be employed for specific durations of time and/or in a low-power state mode to avoid unnecessary battery drain. In some aspects, the accelerometer and/or gyroscope outputs are used to determine the tap-based user input. The gyroscope is configured to detect rotational forces (e.g., yaw, roll, pitch), and the accelerometer is configured to detect forces that are linear in nature. Three example types of motion include: environmentally induced motion (e.g., moving vehicle), unintentional user motion (e.g., walking, shifting posture, placing device on table, and other types of device movement induced by the user doing something other than engaging with the device), and intentional user motion (e.g., a double tap gesture). The challenge solved by embodiments discussed herein includes separating the intentional user motion from the other two types of motion with a latency low enough that the input can support an interactive system.

FIG. 1B illustrates a user 102 performing a tap-based gesture 108 on a side surface of a computing device 100. In some embodiments, the user 102 operating the computing device 100 can provide user selection and input by performing the tap-based gesture 108, for example, a double tap gesture on the side surface (e.g., edge) of the computing device 100. The double tap gesture can be detected by the computing device 100, for example, using data obtained from one or more accelerometers and/or gyroscopes (not shown) in the computing device 100, as well as audio data received from one or more microphones (not shown) in the computing device 100. In some aspects, the computing device 100 includes a device housing such that the double tap gesture may be detected on an outer surface of the device housing.

In detecting the double tap gesture, the computing device 100 can use various approaches to head tracking (not shown)

to discover the location of the user's face to determine if the user 102 is attempting to provide an intentional user input. For example, if the user is now holding the display screen 104 of the computing device 100 closer to the user's face, then a determination can be made that the user 102 is attempting to learn more about features of a particular application running on the computing device 100.

One advantage of detecting a tap-based user input on the computing device 100, as described above, is allowing the user 102 to interact with the computing device 100 without having to obstruct what the user 102 is looking at on the front of the computing device 100 (e.g., content and/or graphical elements presented on the display screen 104).

An overall motivation for a touch-less UI (user interface) is to enhance the user experience by minimizing the amount of touching on the front of the touch screen that may obscure what the user 102 is looking at while the user 102 is using the computing device 100. In some aspects, the double tap gesture includes not touching the touch screen or display screen 104 of the computing device 100, and the double tap gesture can be detected on the back of the computing device 100 while the computing device 100 is placed in the hand of the user.

The double tap gesture can provide an interface to the computing device 100, where the user 102 does not need to touch the front of the touch screen, and the user 102 can still interact with the computing device 100. In this respect, the double tap gesture allows the computing device 100 to obtain a user input that doesn't require the user to touch the touch screen. For example, the user 102 can double tap the back of the computing device 100 to zoom in on a map application, the user 102 can double tap the side of the computing device 100 to change a mode of the map application or the user 102 can double tap any surface of the computing device 100 using at least one motion sensor (e.g., by itself or in combination with other types of touch input components) to enable/disable the computing device 100. For example, a location on the outer surface of the computing device 100 can be assigned a coordinate and associated with an icon being displayed on the computing device 100. In this example, the user 102 can tap the coordinate on the surface and a mapping function (e.g., zoom) corresponding to the coordinate can be performed by the computing device 100.

In some aspects, touchless interactions with the computing device 100 via the tap-based gesture 108 (e.g., the double tap gesture) include having the user's head used as a clutch without having to obscure what the user 102 is looking at with the user's hand (e.g., the user using his or her finger as a stylus). The double tab gesture by itself may be significantly effective but when the double tap gesture is combined with functions that can be performed concurrently, such as head tracking (e.g., the double tap gesture corresponding to head tracking), the double tap gesture can become very useful to provide versatile user inputs and provide valid intentional user inputs.

Gestures as used herein can be considered to include any input, typically a motion, from a user that signifies an intention, such as a single tap, double tap, among other such options. In some embodiments, gestures can be determined by analyzing and/or comparing several events that occur over time. In such instances, a rotational motion sensor may provide data about device motion, for example, but the motion over time may need to be analyzed to determine a specific gesture, such as where a tap might need to have data for multiple motions determined before determining that the motion corresponded to a tap, such as where certain thresholds or ranges must be satisfied to confirm the gesture.

Other advantages, variations, and functions are described and suggested below as may be provided in accordance with the various embodiments.

Figure 2:
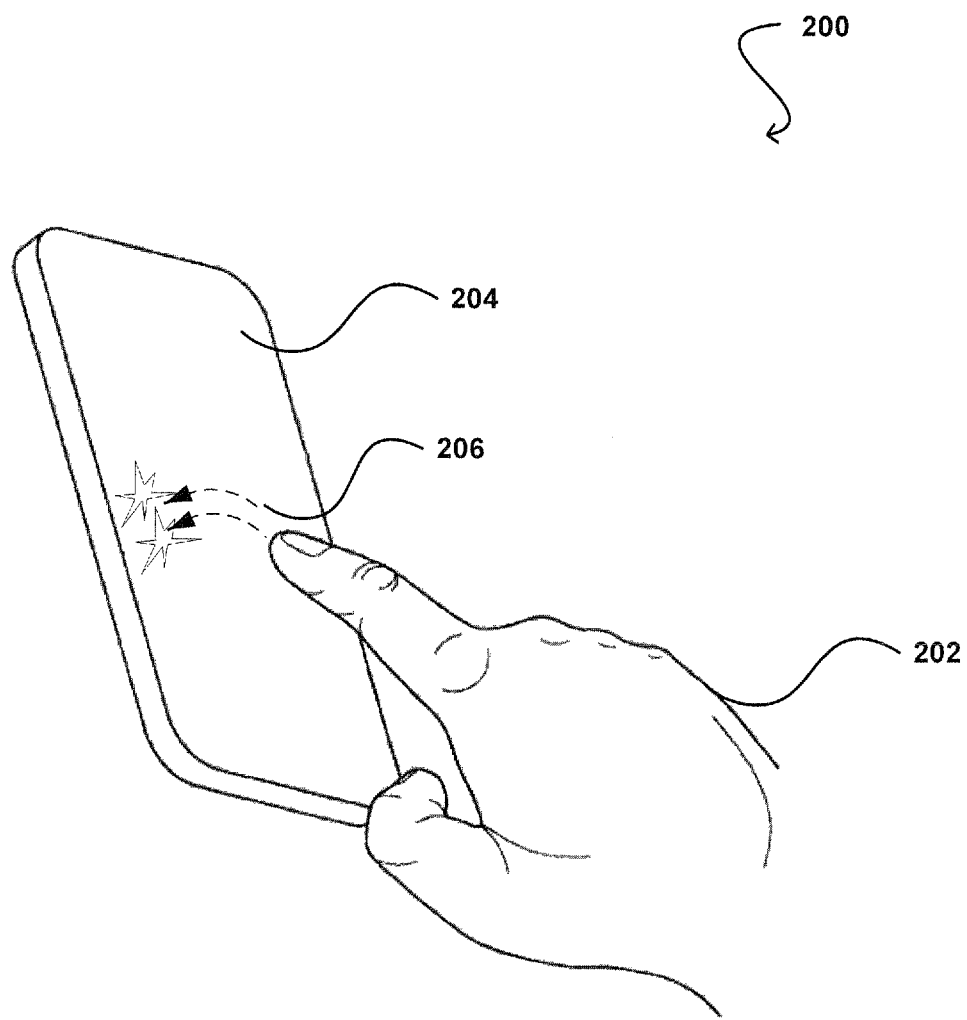
FIG. 2 illustrates an example of a user performing a double tap gesture on a back surface of the computing device, according to certain aspects of the subject technology.

FIG. 2 illustrates a user 202 performing a double tap gesture 206 on the back of a computing device 204, e.g., the computing device 100, as described in reference to FIG. 1. In some embodiments, the user 202 operating the computing device can initiate an input function (e.g., zoom change, mode change, or page change) by performing the double tap gesture 206 on the back of the computing device 204. The double tap gesture 206 involves the user 202 tapping the back of the computing device twice using an implement, e.g., a finger. The double-tap gesture can be detected by the computing device 204, for example, using sensor data obtained from one or more accelerometers and/or gyroscopes in the computing device 204, as well as audio data received from one or more microphones in the computing device 204. In some embodiments, the double tap gesture 206 is detected by the computing device 204 independent of a touch screen of the computing device 204. The double tap gesture may be detected and/or identified using timing and vector properties (e.g., direction and magnitude), where both the timing and vector properties facilitate in filtering out noise associated with the sensor data and audio data. During detection of the double tap gesture 206, the computing device 204 can use various approaches to head tracking to discover the location of the user's face to determine if the user is intending to provide a tap-based user input. The head tracking approaches are described in further detail below with respect to FIGS. 10A-10D, 11A-11D and 12A-12H.

In some aspects, the computing device 204 includes at least one processor (not shown) and a memory (not shown) storing instructions that, when executed by the at least one processor, cause the computing device 204 to perform operations including, but not limited to, detecting first and second device motions within a first time period. The first and second device motions may be separated by a second time period. The computing device 204 can determine that the second time period is one or more of within a specified time range, smaller than a first specified time and greater than a second specified time. The computing device 204 can determine that a first motion metric for the first device motion is likely indicative of a first tap on a surface of the computing device 204. Similarly, the computing device can determine that a second motion metric for the second device motion is indicative of a second tap on the surface of the computing device 204. The computing device 204 can determine that a first coordinate frame of the computing device 204 associated with the first tap is within a range of angular degrees from a second coordinate frame of the computing device 204 associated with the second tap. The computing device 204 can further determine the first tap and the second tap as part of the double tap gesture 206.

Figure 3:
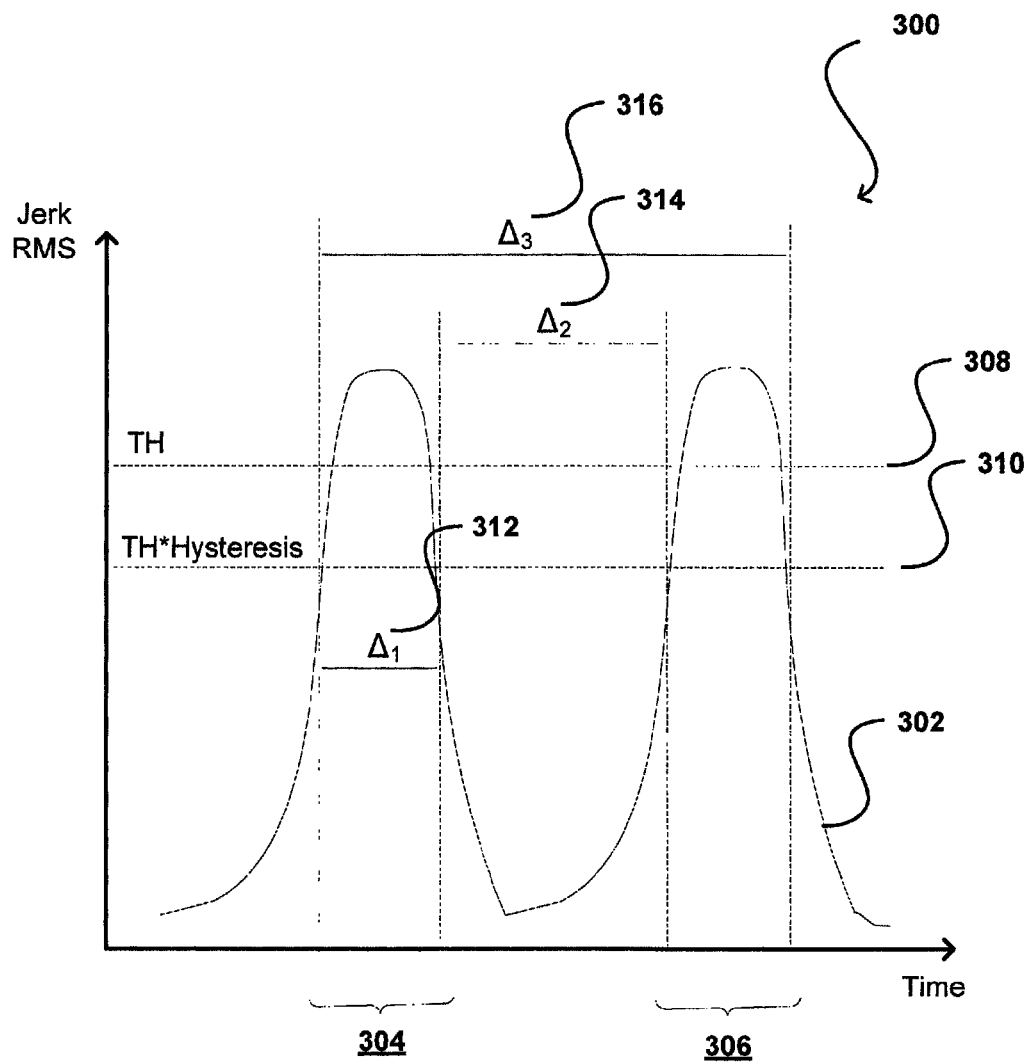
FIG. 3 illustrates an example of a plot for detecting the double tap gesture, according to certain aspects of the subject technology.

FIG. 3 illustrates an example of a plot 300 for detecting a double tap gesture, according to certain aspects of the subject technology. The plot 300 includes a continuous stream of sensor data 302 (e.g., gyroscopic output) plotted over time, where a motion detection algorithm is configured to analyze device movement and determine changes in energy in response to the device movement. For example, the sensor data may be based on movement of a MEMs component in the gyroscope and/or accelerometer of a computing device, e.g., the computing device 100 of FIG. 1, but the movement represents an external force, e.g., causing movement of the computing device.

In the continuous stream of sensor data, there are two device motions observed in sequence. The first step may include performing a computation on the sensor data (or gyroscope output) to calculate a jerk RMS (root mean square) for each rotational motion. The jerk RMS is comprised of a jerk value and the root mean square of that jerk value, where the jerk value is the second derivative of angular velocity since the gyroscopic output is in terms of velocity. The two derivatives of the gyroscopic output are computed to obtain the jerk value (e.g., the rate of change of angular acceleration), and then the RMS of that jerk value is computed over a number of samples (e.g., three), which yields an envelope of RMS values.

When a user (e.g., user 102 of FIG. 1B) taps a computing device, e.g., the computing device 100, as described in reference to FIG. 1, a large amount of change in acceleration may be detected and computed to determine the jerk RMS. In turn, the jerk RMS is provided to a tap detector (not shown) of the computing device 100, which is configured to determine if the envelope of RMS values fits within specified boundaries that are defined to represent what an ideal (or desirable) tap should look like. In this regard, the jerk RMS has to go above a certain jerk RMS threshold (e.g., movement threshold 308), and has to last more than a first certain amount of time and less than a second certain amount of time (e.g., gap window 312). When the tap sample passes those gates, the tap sample is identified as a single tap (e.g., tap 304). Beyond that, another single tap (e.g., tap 306) is detected, and those two taps together (e.g., taps 304, 306) have to bounded within a certain amount of time of each other (e.g., window threshold 314). The sequence of taps 304 and 306 may be identified as a "double tap gesture." In some aspects, the two taps 304 and 306 in sequence need to occur within a certain window of time (e.g., double tap window 316).

In certain aspects, the jerk RMS for the gyroscopic output includes a range of 2000 rad/s/s to 3000 rad/s/s. In an aspect, the movement threshold 308 is set to 2500 rad/s/s. Each change in energy to be considered a tap needs to cross the movement threshold 308. As such, the plot 300 also includes a movement threshold 310 that represents rate of change of angular acceleration for the change in energy not to be considered a tap. In this respect, a change in energy that crosses below the movement threshold 310 may represent the non-presence of a tap. The movement threshold 310 may represent a ratio between the jerk RMS value corresponding to the threshold 308 and a hysteresis factor. In some aspects, the hysteresis factor is set to 0.8 (or 80%) but can be of varying percentages depending on implementation. In an aspect, the movement threshold 310 corresponds to 2000 rad/s/s (e.g., 0.8*2500). For example, in a double tap gesture, the jerk RMS is observed to go above 2500 for the first tap 304, then below 2000 in between the first and second taps 304 and 306, and then above 2500 again for the second tap 306. The time between the two taps 304 and 306 may be at least 100 milliseconds (ms), and both taps may need to occur within 333 ms of each other (e.g., window threshold 314).

At least three samples may be used to calculate the jerk RMS so the jerk RMS is calculated as the mean of three jerk samples. For every gyroscopic sample, the difference from a previous gyroscopic sample may be subtracted to obtain a gyroscopic acceleration value. The acceleration value is stored, and the acceleration value is then subtracted from the previous acceleration value to determine the jerk value for a current jerk RMS sample.

In some aspects, the jerk value is placed into a rolling buffer, which is three deep but may be of varying sizes depending on implementation. The acceleration value also may be pushed into the buffer. The jerk RMS may be calculated based on each individual jerk sample being squared, the mean of those squared values being taken, and then the square root of that mean being computed. The jerk RMS may be expressed as follows:

$$\sqrt{\frac{a^2 + b^2 + c^2}{3}} \quad \text{(Equation 1)}$$

where the a, b and c values represent the individual jerk samples. The jerk RMS may represent energy, particularly, the change in energy state. For example, starting from an inertial state and ending until detecting a tap in the back of the computing device, where an amount of energy has been transferred into the computing device, the change in energy state in response to the tap corresponds to the change in acceleration experienced by the computing device.

In some aspects, the duration of a double tap event (e.g., detection of the double tap gesture) is within a window of time set to 333 ms (e.g. window threshold 314), which includes the time from the end of the first tap 304 until time that the second tap 306 has to occur. The window threshold 316 may be configurable to include a range of 250 ms to 500 ms. The window threshold 316 may be extended beyond 500 ms but the amount of noise experienced by the gyroscopes and/or accelerometers may increase.

The jerk RMS value, while above the movement threshold 308, may be stored for all samples that are output from the gyroscopic and/or accelerometer. When the jerk RMS value comes back down (e.g., travels below the movement threshold 310), all the data for that window has been captured in memory. In turn, the stored data can be used to perform a correlation check for that tap as will be discussed below with respect to FIGS. 4A-4C. For example, the jerk RMS data that is stored may be used to determine the rotation of the computing device for each tap. While the jerk RMS value is above the movement threshold 310 for each tap, the amount of rotation in response to the first tap 304 and the second tap 306 may be computed. In this respect, the angle between those two rotations may be computed using the stored data. The accelerometer data, head position data and audio data also may be stored in memory.

Figure 4A:
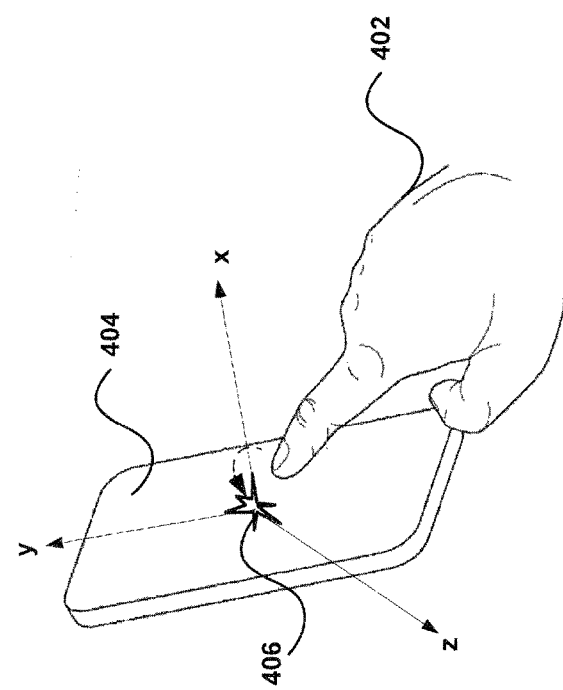
FIGS. 4A-4C illustrate examples of detecting a double tap user input on the computing device, according to certain aspects of the subject technology.
Figure 4B:
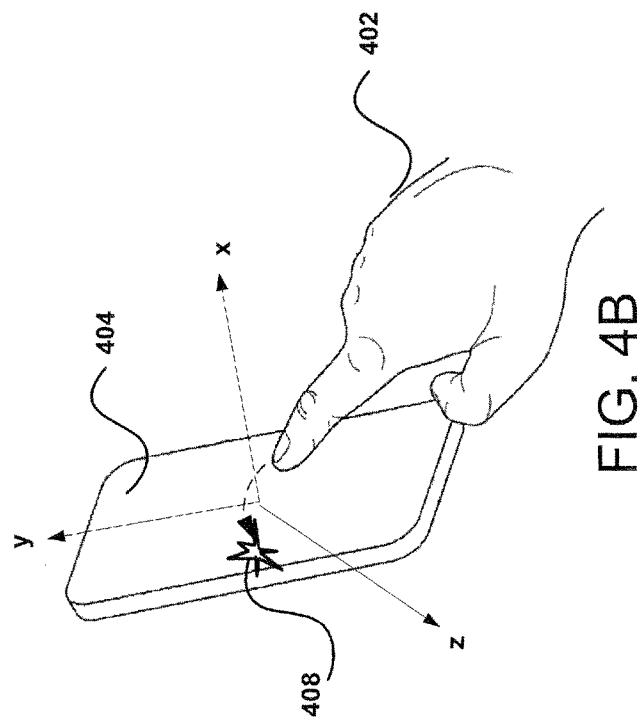
Figure 4C:
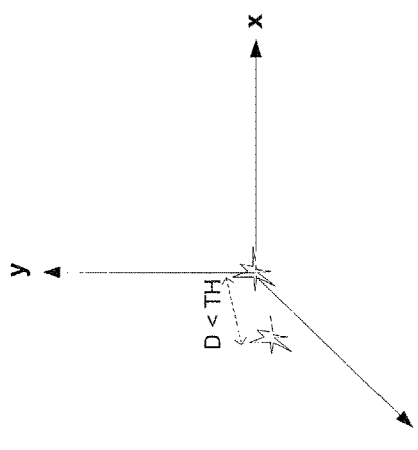

FIGS. 4A-4C illustrate examples of detecting a double tap gesture on a computing device 404, e.g., the computing device 100, as described in reference to FIG. 1, according to certain aspects of the subject technology. FIG. 4A illustrates a user 402 applying a first tap-based gesture 406 on the back of the computing device 404. FIG. 4B illustrates the user 402 applying a second tap-based gesture 408 on the back of the computing device 404. FIG. 4C illustrates a symmetry check (or a correlation check) being performed on a candidate double-tap sequence to determine if the detected taps were intentionally provided by the user 402 of the computing device 404.

When the computing device 404 is tapped, the tap causes a small device rotation. Taps in a similar spot (or region) on the device will have a similar axis of rotation. For each pair of taps in a double tap gesture, the rotational axes must be within a certain angle of each other, otherwise the double tap will be rejected. In this respect, the symmetry check enables rejection of false positives and/or false negatives.

The symmetry check may include determining that there were two taps on the back of the computing device 404, and determining how similar the taps were to each other. In this respect, the axis of the computing device 404, in response to each tap, may be captured by the gyroscope of the computing device 404 to provide an indication of how close on the back of the computing device 404 the taps were to each other. In some aspects, the magnitude (e.g., the amount of force applied for the tap) may be factored into determining the amount of rotation detected on the back of the computing device 404. In some aspects, the tap is rejected if the amount of rotation and/or magnitude did not satisfy certain thresholds of the symmetry check (e.g., a symmetry threshold).

For the symmetry check, we may determine the axis of rotation for each tap, and both axes should be rotating in the right direction (e.g., same direction as each other) within the symmetry threshold. The axes of the computing device 404 should be rotating such that when the user 402 holds the computing device 404 in a portrait mode, the top edges of the computing device 404 come towards the user 402 when the user 402 taps the back of the computing device 404. In this respect, the direction of the rotation may be analyzed from the beginning of the tap while the computing device 404 is moving toward the user 402.

The symmetry threshold may be set to 0.6, which equates to approximately 74 degrees of rotation, but the threshold may set to other varying values depending on implementation. The symmetry threshold represents the angle between the two axes of rotation, so the two axes should be within 74 degrees of each other to be considered valid taps on the back of the device. The symmetry threshold may be determined by a combination of physiological factors including, but not limited to, how close the user 402 would tap the same spot, and noise accounted for by movement capture sensors of the computing device 404 (e.g., gyroscopes, accelerometers).

In some aspects, the data ranges included in the symmetry threshold for determining the distance between taps can include preset values provided by a manufacturer and/or service provider. The data ranges may be configurable by the user 402. For example, the user may be prompted to perform a double tap gesture in order to perform a configuration of the computing device 404. In some aspects, the data ranges can be determined through machine learning over time by the computing device 404.

As shown in FIG. 4C, the distance between the first tap-based gesture 406 and the second tap-based gesture 408 is less than the symmetry threshold (e.g., within 74 degrees of each other), and therefore, the two taps may be considered a valid double tap gesture intended by the user 402. Otherwise, one of the two taps (e.g., the second tap-based gesture 408) or both taps may be rejected if the distance between the taps is determined to be greater than the symmetry threshold.

Unlike the gyroscope, the accelerometer outputs linear acceleration information. On the other hand, the gyroscope has the advantage of more directly sampling the primary motion caused by a tap but has the disadvantage of often times of inferior quality sensor data and the need to disambiguate the readings from gravity and other environmental motions. In order to address the effects of gravity, the accelerometer may be employed. The jerk RMS values based on the accelerometer output may be used instead of the accelerometer values from the gyroscope output for further computations.

One approach that can be useful in improving accuracy is using the location of the gyroscope within the computing device 404 (e.g., where placed in device). In this respect, if you are looking for rotational forces, and the gyroscope is placed on one side of the device, the device will rotate the same amount but the mass of the device will differ where the device is being tapped. As such, the center of mass may be a factor. Devices may not have their mass spread evenly across the device, so the devices may not respond the same if tapped on a left side of device versus a right side of device. In some aspects, the differences in rotational speed and/or acceleration may be compensated for depending on the location of the mass related to the gyroscope. Knowing the center of mass may be interesting factor when determining double tap events. The tap detector may be communicatively coupled to a gyroscope but may receive an output from an accelerometer as an extension.

If the gyroscope sensor is placed in center of device, and a tap is detected on the center of device, a rotational force may not be observed even though the tap is detected as a valid double tap (e.g., a theoretical dead zone). However, placing an accelerometer at the center of the device, the double tap would show up on the accelerometer output. In this respect, it may be desirable to have a combination of the gyroscope output and accelerometer output. If the user taps off center, then the gyroscope data may be more useful. If the user taps on center, the accelerometer data may be more useful. The accelerometer can help do a better job of removing false positives that are detected versus using only the gyroscopic data. With the accelerometer data, a determination of whether the user is tapping on the back of the device versus the front or sides may be more prevalent than with gyroscopic data alone. With the gyroscope data, the determination is not as obvious in distinguishing which side of the device is being tapped. The accelerometer data may be used if the tap detector is configured to detect only back taps, and the tap detector is attempting to avoid anything that would have been an inadvertent tap, and was actually on the front of the device and unintentional.

In some aspects, a prototypical tap accelerometer dataset (or an expected linear acceleration dataset) may be defined to compute a distance (e.g., the Euclidian distance) between a current sample dataset (or an actual linear acceleration dataset) and the prototypical dataset. This has the additional advantage of being able to reliably disambiguate between taps on the front, back, or sides of the computing device 404. The tap detector can then keep track of a running mean of distance values, and compare the current distance value to the mean of distance values to see if the computation has exceeded the threshold required to emit a tap signal. The tap detector can then utilize the same timing envelope computation as described above with respect to FIG. 3 to determine if two taps have been detected within a specific amount of time but not too close together. The above technique could also be used in conjunction with gyroscopic-based detection as a means of removing false positives from the gyroscopic data stream. As described above, the tap detector may be configured to only detect taps on the back of the computing device 404.

The Euclidian distance computation, for an n-dimensional space, may be expressed as follows:

$$d(p,q)=\sqrt{(p_1-q_1)^2+(p_2-q_2)^2+...+(p_i-q_i)^2+...+(p_n-q_n)^2}. \quad \text{(Equation 2)},$$

where p includes the set of points that achieves optimal configuration as to what a single tap should look like, and q includes the values that are actually read from the accelerometer. The Euclidian distance may be configured for two x, y coordinates in two dimensional space (e.g., x0, x1, y0, y1). The Euclidian distance may not be limited by the number of dimensions. A new term may be added for a three-dimensional space (z0, z1), for example. In an aspect, the n-dimensions variable for a four-dimensional space is set to 4 (e.g., n=4). If a larger sample is desirable, then additional terms may be added as additional dimensions to get a larger dataset (e.g., four samples is equivalent to 4 dimensions).

The jerk value may be determined after being subtracting once because accelerometer values are already in terms of acceleration, whereas the gyroscopic values are in terms of velocity that requires to be subtracted twice to get the jerk value. The measured jerk values are input as the q values, and the expected jerk values are input as the p values. The distance indicates how far the measured sample is from the ideal sample, and provides gives a distance value from the ideal sample. In this respect, a perfect match would yield a result of zero.

In some aspects, the prototypical tap accelerometer dataset is stored for further processing, and determined characteristically based at least in part on a wide user set. For example, the prototypical tap accelerometer dataset may be determined experimentally using a large sampling from a large number of users. In turn, the data is combined all together using some conventional techniques for gathering gesture information to produce the prototypical tap accelerometer data, which includes a set of idealized taps that represent what a tap should look like on average. The measured accelerometer dataset may then be compared to the prototypical dataset to determine the distance between the two datasets.

The prototypical tap accelerometer dataset may include four samples, which cover approximately 40 milliseconds of data but the prototypical tap accelerometer dataset can include a varying number of samples depending on implementation. In some aspects, the two datasets (e.g., the prototypical accelerometer dataset and the actual accelerometer dataset) are stored in volatile memory (e.g., RAM). In some aspects, the code (or instructions) that cause the computing device 404 to perform the dataset comparisons is stored in non-volatile memory (e.g., flash, ROM).

In some aspects, determining if the device has a non-uniform mass to help facilitate the distance determination between the prototypical and measured datasets may be performed. The non-uniform mass detection may be a factor for gyroscopic data, and would also be a factor for accelerometer data if the mass of the device is not where it is expected to be. The uniformity of mass on a computing device 404 may be primarily determined by where the battery (e.g., power source for computing device 404) is located on the computing device 404. Batteries are not necessarily spread across the back, and may sometimes be positioned on the bottom end of the computing device 404. If the distribution of the mass across the device is known, based at least in part on manufacturing data that states what the device is expected to weigh, and the location of a tap is also known, the tap-based gesture can be potentially distinguished as a candidate tap for user input.

Figure 5B:
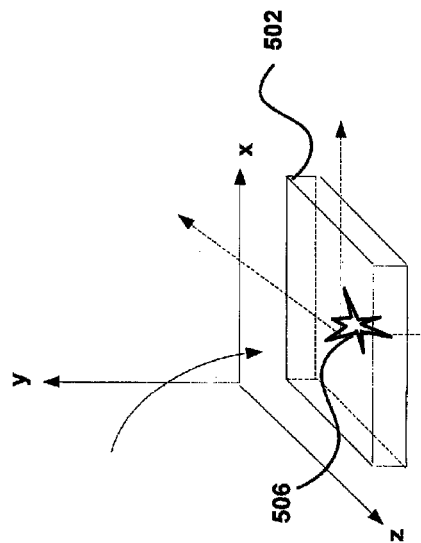
FIGS. 5A-5C illustrate examples of detecting a tap-based input on the computing device, according to certain aspects of the subject technology.
Figure 5C:
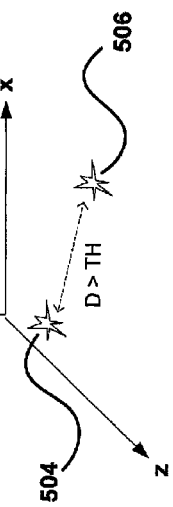
Figure 5A:
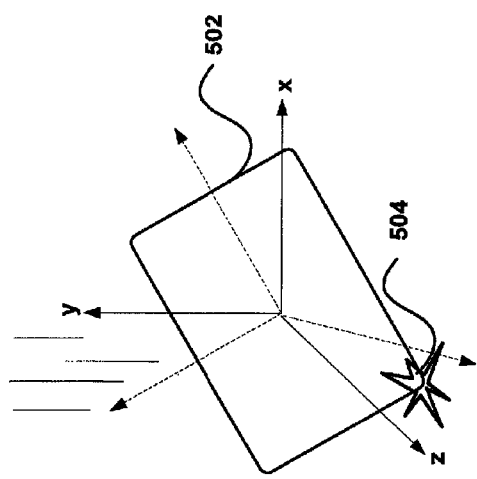

FIGS. 5A-5C illustrate examples of detecting a tap-based input on the computing device, according to certain aspects of the subject technology. FIG. 5A illustrates a computing device 502, e.g., the computing device 100, as described in reference to FIG. 1, falling onto an environmental surface (e.g., floor, table top, etc.) and experiencing a first tap-based gesture 504 on a corner of the computing device 502. FIG. 5B illustrates the computing device 502 falling flat onto the surface and experiencing a second tap-based gesture 506 on one side of the computing device 504. FIG. 5C illustrates the symmetry check, as described above, being performed on another candidate double-tap sequence to determine if the detected taps were intentionally provided by a user of the computing device 502.

In this respect, setting the device down poses a challenge in distinguishing intentional taps from inadvertent taps since there is a tendency to set one side of the computing device 502 down and then the other side (or portion thereof) down, which creates a similar double tap sound on the back of the computing device 502. However, the symmetry check provides that the axis of rotation for the movement of the computing device 502 as shown in FIGS. 5A and 5B to be actually 180 degrees almost apart for the two detected taps. The symmetry check confirms that the taps caused by the movement of the computing device 502 are in fact inadvertent, and not intended to represent a user input. In some aspects, the symmetry check can distinguish taps derived from a situation where the computing device 502 is thrown to the floor, and not have the computing device 502 register a double tap. In this regard, the axis rotation data from the gyroscope or other inertial sensors may be employed to determine the rotational change of the computing device in response to a physical tap.

As shown in FIG. 5C, the distance between the first tap-based gesture 504 and the second tap-based gesture 506 is greater than the symmetry threshold (e.g., outside of 74 degrees of each other), and therefore, the two taps may not be considered a valid double tap gesture. As observed with respect to FIGS. 4C and 5C, the symmetry check can confirm whether a detected double tap gesture is an intentional user input based at least in part on the angular correlation between the two taps.

Figure 6:
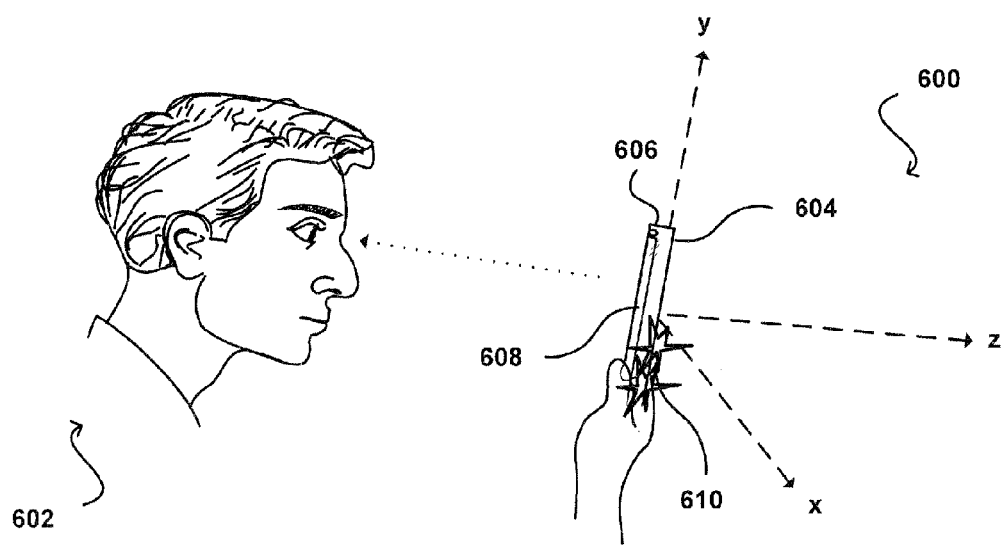
FIG. 6 illustrates an example of detecting the double tap user input with head tracking, according to certain aspects of the subject technology.

In FIG. 6, a user 602 is shown viewing a display screen 608 of a computing device 604, e.g., the computing device 100, as described in reference to FIG. 1. The computing device 604 includes at least one imaging element, e.g., a camera 606.

In the example of FIG. 6, the camera 606 is located on the front of the computing device 604. However, the cameras need not be placed in any particular position relative to the computing device 604 to perform the operations described in the subject disclosure. For example, in some instances, the computing device 604 may include a first camera on the front of the computing device 604 that is configured to detect and track objects that are positioned in front of the computing device 604 and second camera on the back of the computing device 604 that is configured to detect and track objects that are positioned in the back of the computing device 604. In another example, the computing device 604 can have the first camera and the second camera on the front of the computing device 604. In this example, the first and second cameras can be used in combination to detect and track objects, e.g., using epipolar geometric techniques, as described below.

The computing device 604 can include other types of imaging elements including, for example, ambient light sensors and Infrared (IR) sensors. The computing device 604 can also include various sensors that are configured to determine a motion, or orientation, of the computing device 604. For example, the computing device 604 can include an Inertial Measurement Unit (IMU) unit that includes various sensors, e.g., accelerometers, gyroscopes, magnetometers, inclinometers, proximity sensors, distance sensors, depth sensors, range finders, and ultrasonic transceivers. In an aspect, the IMU unit is internal to the computing device 604, between a touchscreen display of the computing device 604 and a device housing of the computing device 604.

For example, a software application executing on the computing device 604 can be configured to detect and track objects that are in an image plane of the computing device 604 using, for example, one or more computer vision algorithms. The image plane is defined by a field of view that is observable by the camera 606 of the computing device 604 based on the position of the computing device. Thus, as the position of the computing device 604 changes, so does the image plane. Naturally, as the computing device 604 is moved, the positions of objects in the image plane will change with respect to the movement of the computing device 604.

In some aspects, there is a head position check, separate from the symmetry check that uses the user's head as a clutch. In this regard, if there is no head in view, then the tap detector can automatically drop any double tap event 610 that occurs (e.g., a double tap gesture). During the double tap event 610, the head or face of the user of the computing device 604 should have been detected by the head position sensors within a specified duration of time prior to the second tap. In some aspects, the specified duration of time is set to 100 ms but may include varying ranges of time depending on implementation. Checking for the head position in addition to the symmetry check helps reduce false positives in scenarios such as where the computing device 604 is picked up and down by the user.

In an aspect, the head position check may be disabled (or opted-out) by the user, and not used in conjunction with the symmetry check. For example, if a user using the computing device 604 with a remote control, where the user is using the remote control to control the audio output, detection of the double tap event 610 may be accomplished without having to place a face or hand in view of the computing device 604. As the head tracking technology improves, the same calculations for sensor data can be applied to head tracking data including calculating small changes in head position and distance as the computing device 604 is tapped.

When a double tap candidate is passed the symmetry check, the head tracking is running separately. The head position check may include a brief check to determine how long it has been since a head tracking event was detected (e.g., when was there a face in view?). In some aspects, checking for the head tracking event can be performed concurrently with the symmetry check, or can be performed subsequent to the symmetry check depending on implementation. If the brief check yields that the head tracking event has taken place more than 100 ms, then the tap detector may reject the double tap event 610 (e.g., the actual time from the last head tracking event has exceeded the expected time gap).

In some aspects, the time gap between a tap event and a head tracking event may be determined based on a collection of data relating to the computing device 604. In an aspect, the time gap may be determined by machine learning over time. In an aspect, the time gap may be no smaller than 33 ms since the camera 606 may be set to run at 30 frames per second. In this regard, allowing the tap detector to check for a head tracking event sooner than 33 ms may not allow the head tracking algorithm sufficient time to check. In some aspects, the time gap may exceed 100 ms but the time gap should be preferably small as possible. In some embodiments, the head position check may include a supplemental check for the entire duration of the double tap event 610, e.g., checking the time from the first tap throughout the second tap.

In certain aspects, the computing device 604 includes low power microphones (not shown) that are configured to constantly run. Some devices already include multiple microphones for the purpose of noise cancellation. This microphone data could be used to detect taps and, in the case of multiple microphones, could detect the location of the tap on the computing device 604. Additionally, it would be possible to correlate microphone data, accelerometer data, head position data, and gyroscope data to obtain a tap detection that is robust in a variety of operating conditions.

In an aspect, the microphone is connected to an amplifier circuit for amplifying the microphone data. The microphone has a high dynamic range for the input, and provides an additional data stream that can be combined with the rotational data (e.g., gyroscopic data) and linear movement data (e.g., accelerometer data). The surface and/or exterior of the computing device 604 can be configured such that the computing device 604 resonates differently for different spots (or regions) on the device. If a microphone is employed, taps detected on the upper right or upper left corners may correspond to respective resonating sounds. For example, for a dragging or a swiping gesture on the surface of the computing device 604, the characteristics of the surface may change in response to the sliding so that the surface of the computing device 604 is resonating differently and helping to locate the tap. Many devices currently use microphones on multiple locations to perform noise cancellation. In this respect, software running on the computing device 604 may be configured to execute instructions that determine the location of the tap based on the resonating sounds for respective locations on the device.

Accelerometers are increasingly producing lesser noise levels such that the accelerometers approach the noise levels of gyroscopes. In this respect, the accelerometers can be combined with gyroscopes more practically. As described above with respect to the head position check, the user's head may be used as a clutch but as head tracking improves, the head position check may rely less on data output from the sensors of the IMU unit, and instead rely on the actual head position (e.g., using the distance from the computing device 604 to the user's head to calculate more accurately the head position in real-time). For example, when a user taps the back of the device, the device will move slightly closer to the user's head. In this respect, the mass of the computing device 604 (including an indication of the mass distribution on the device), along with the accelerometer output, can be applied towards computing the distance to the head.

The computations for determining the jerk value and jerk RMS as described above can be reapplied based on the distance to the head. For example, the distance to the head can be used to compute velocity towards the head, then acceleration towards the head, and then jerk towards the head. Then the symmetry check and/or head position checks can be performed to determine if the computed jerk RMS values based on the distance to the head correspond to a valid (or at least intentional) user input. Given enough accurate head tracking, and new thresholds, the system can be more robust since the double tap detection would be related to the user's head and not the rotational motion sensors (e.g., gyroscopes), which may have no notion of where the user is located.

In some aspects, user intent may be extracted (e.g., when the user intended a double tap versus when the user had not intended a double tap) to refine the thresholds on a user-to-user basis or a hand-by-hand basis. For example, if a user is holding the device on his or her right hand, the device might learn over time that, based upon what cameras are obstructed, that the intended double tap is associated with a first set of values, whereas if the user holds the device with a left hand, the intended double tap is associated with a second set of values. Once the hand used to hold the device is known, the symmetry check may include information that indicates that the tap will tend to be towards one end of the device versus the other (e.g., if the device is placed in the user's right hand, the likelihood that the user will tap the back right of the device is very low). This additional check can help facilitate the rejection of false positives since a tap on the front of the device appears similar to a tap on the back of the device.

Figure 7:
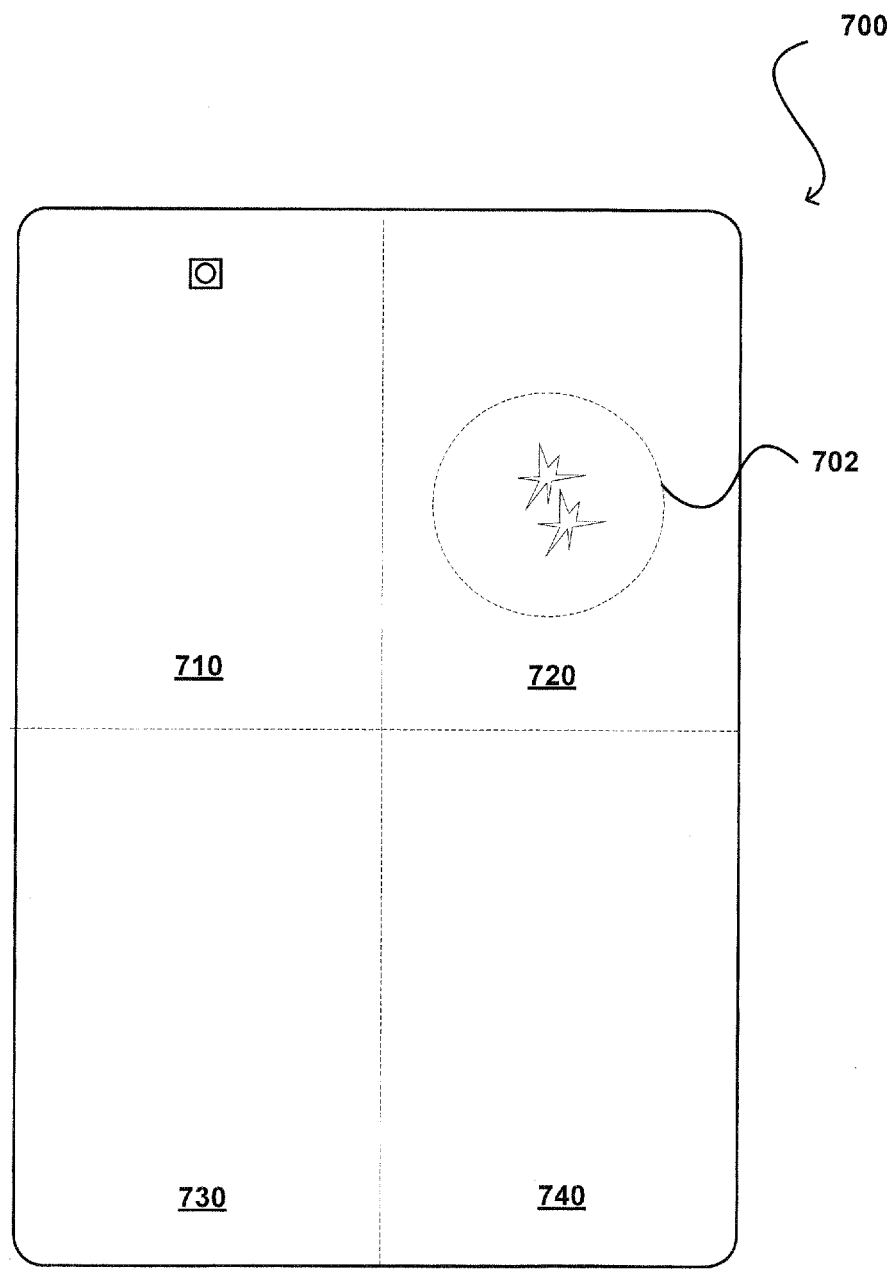
FIG. 7 illustrates an example of detecting a type of user input for a corresponding double tap gesture, according to certain aspects of the subject technology.

FIG. 7 illustrates an example of detecting a type of user input for a corresponding double tap gesture, according to certain aspects of the subject technology. In FIG. 7, a computing device 700, e.g., the computing device 100, as described in reference to FIG. 1, is shown with partitions 710, 720, 730 and 740 as separate quadrants. In some aspects, rotational axis information from the symmetry check can be used to determine approximate tap location on the computing device 700, for example, dividing the device into four quadrants, and determining which quadrant the user has tapped such that the information could be used to enable more types of user input. As shown in FIG. 7, the location of a double tap gesture 702 can be determined to correspond to partition 720 such that a user input corresponding to partition 720 can be enabled as a user input to the computing device 700.

The location of the tap can create an increasing number of corresponding user inputs. In some aspects, the tap detector (not shown) detects a double tap somewhere on the back of the computing device 700. In an aspect, additional information may be determined that includes an indication of where on the back of the computing device 700 the tap was detected. This may be accomplished by narrowing down, to quadrants of the computing device 700, including inertial-type sensors located proximate to an outer surface of a device housing of the computing device 700, a determination on where on the device using a combination of the rotational axis information can be used to locate the tap. In some aspects, an indication of an axis of the computing device 700 may be provided such that if a line is drawn out from the center of the device, and the tap is somewhere along that line, using magnitudes, a determination can be made on how far out from the center of the device the tap occurred.

Figure 8:
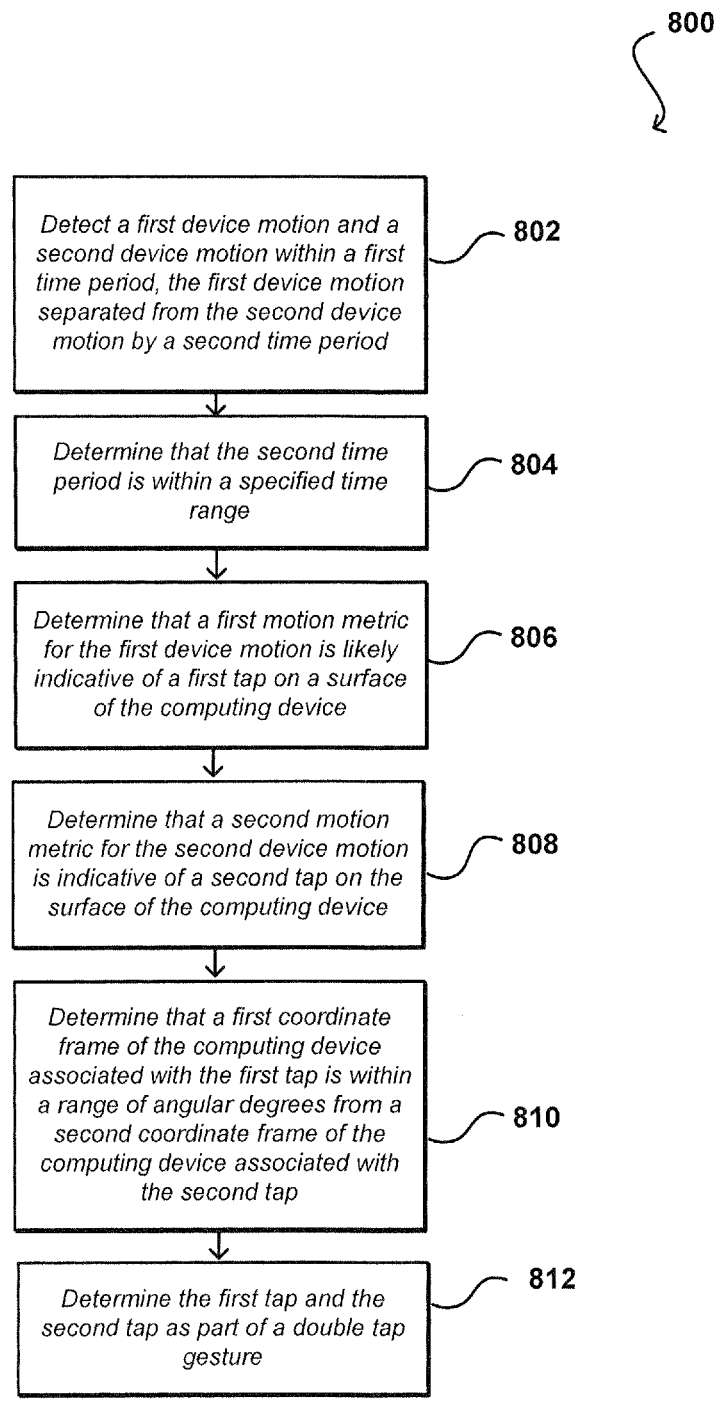
FIGS. 8 and 9 illustrate flow charts of example processes of detecting tap-based user input on the computing device, according to certain aspects of the subject technology.

FIG. 8 is a flow diagram of an example process 800 of detecting tap-based user input on a computing device, e.g., the computing device 100, as described in reference to FIG. 1. The example process 800 is provided merely as an example and additional or fewer steps may be performed in similar or alternative orders, or in parallel, within the scope of the various embodiments described in this specification.

A computing device can detect first and second rotational motions (or device motions) within a first time period on a computing device (802). In some aspects, the first and second rotational motions are separated by a second time period. The second time period is determined to be within a specified time range (804). The second time period may be smaller than a first specified time or greater than a second specified time depending on implementation.

As described herein, the term "motion metric" may relate to one or more metrics including, but not limited to, the jerk value, the jerk RMS, and/or the envelope of jerk RMS values. The first and second rotational motions may be detected in response to contact on a surface of the computing device outside of a display screen of the computing device. In this respect, taps detected on the back surface and/or sides of the computing device may cause a small device rotation (or motion).

The computing device can determine that a first motion metric for the first rotational motion is likely indicative of a first tap on the surface of the computing device (806). The computing device can determine that a second motion metric for the second rotational motion represents a second tap on the surface of the computing device (808). As described with respect to FIG. 3, the motion metric has to cross above the movement threshold to be considered a single tap. The computing device can determine that a first coordinate frame of the computing device associated with the first tap is within a range of angular degrees from a second coordinate frame of the computing device associated with the second tap (810). As discussed above with respect to FIGS. 4A-C, the two taps should be close enough to each other to be considered as part of a double tap gesture intended by the user. As such, the computing device further can identify the first and second taps as part of the double tap gesture for purposes of input to the computing device (812). In this respect, the double tap gesture may be confirmed to be an intentional user input for zooming in on a mapping application, for example, without the need for the user to touch the touchscreen and obscure what the user is looking at on a display screen of the computing device.

Figure 9:
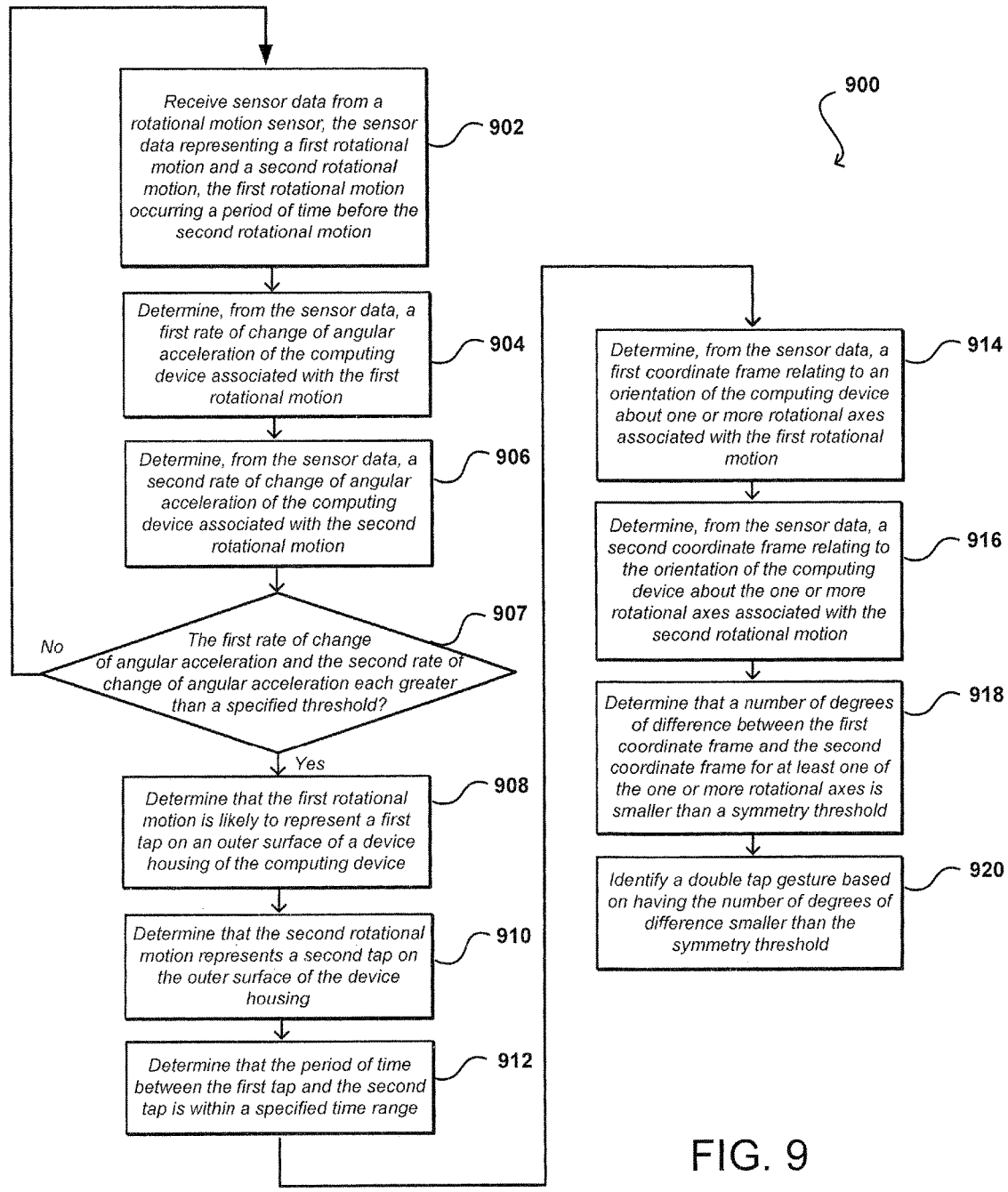

FIG. 9 is a flow diagram 900 of an example process of detecting tap-based user input on a computing device, e.g., the computing device 100, as described in reference to FIG. 1. The example process 900 is provided merely as an example and additional or fewer steps may be performed in similar or alternative orders, or in parallel, within the scope of the various embodiments described in this specification.

In some aspects, the computer device receives sensor data that represents first and second rotational motions with the first rotational motion occurring a period of time before the second rotational motion (902). The computing device may include a device housing and a touchscreen display. The sensor data may include rotational data and/or translation data of the computing device that corresponds to the first and second rotational motions. The movement of the computing device may be captured by the at least one device sensor of the computing device in response to the first and second rotational motions. In an aspect, the at least one device sensor is a rotational motion sensor that is internal to the computing device, between the device housing and the touchscreen display. The first and second rotational motions may relate to respective contacts with a surface of the computing device outside of the display screen at respective times.

The computing device can determine, from the sensor data, a first rate of change of angular acceleration of the computing device associated with the first rotational motion (904). Similarly, the computing device can determine, from the sensor data, a second rate of change of angular acceleration of the computing device associated with the second rotational motion (906). The computing device can determine whether the first rate of change of angular acceleration and/or the second rate of change of angular acceleration are each greater than a movement threshold (907). If the rate of change is determined to be greater than the movement threshold, then the computing device proceeds to step 908. Otherwise, the computing device returns to step 902 and obtain the next set of sensor data.

The computing device can determine that the first rotational motion is likely to represent a first tap on an outer surface of the device housing (908). Likewise, the computing device can determine that the second rotational motion represents a second tap on the outer surface of the device housing (906). In some aspects, the first and second taps may be detected on a surface of the computing device, outside of the display screen of the computing device. The computing device can determine that the period of time between the first tap and the second tap is within a specified time range (912).

The computing device can determine, from the sensor data, a first coordinate frame relating to an orientation of the computing device about one or more rotational axes associated with the first rotational motion (914). Similarly, the computing device can determine, from the sensor data, a second coordinate frame relating to an orientation of the computing device about one or more rotational axes associated with the second rotational motion (916). In turn, the computing device can determine that a number of degrees of difference between the first coordinate frame and the second coordinate frame for at least one of the one or more rotational axes is smaller than a symmetry threshold (918). In this respect, the first tap and the second tap causes a respective amount of device rotation, and the symmetry check as described in step 918 can validate that the two taps (e.g., the first tap and the second tap) are part of an intentional user input. In this respect, the computing device can identify the first tap and the second tap as part of a double tap gesture in response to the angular difference between the first and second coordinate frames being within the symmetry threshold (920). On the other hand, if the angular difference is greater than the symmetry threshold, the second tap with the respect to the first tap can be identified as part of an unintentional user input since the orientation of the computing device from the first tap to the second tap would be inconsistent with an intentional user input.

The computing device may receive head position data captured by at least one image capture element of the computing device. The head position data may be used to reduce noise associated with the sensor data. In turn, the computing device may detect a head position event based at least in part on the received head position data, the head position event relating to movement of a user's head associated with the contact. The computing device may determine that the head position event was detected within a specified amount of time prior to the second tap. In some aspects, the detected tap (e.g., the second tap) may be rejected as part of the double tap gesture in response to the head position event being outside of the specified amount of time with respect to the second tap (e.g., the user's head being present concurrently with the first tap but not present for the second tap).

The computing device may receive rotational data from at least one device sensor of the computing device. In some aspects, the rotational data includes rotational acceleration values for a plurality of rotational axes. The computing device may determine at least one jerk sample based at least in part on a second derivative computation of at least one of the rotational acceleration values for at least one rotational axis. In some aspects, the at least one of the rotational acceleration values corresponds to a rate of movement of the computing device in response to the contact. The computing device further may determine a quadratic mean computation over a plurality of jerk samples (e.g., three example jerk samples). In some aspects, the motion metric includes a range of quadratic mean computations. In this respect, the computing device may determine that the range has a length greater than a first time threshold and smaller than a second time threshold. In an aspect, the second time threshold is greater than the first time threshold, and the specified time threshold is bounded by the first and second time thresholds.

The computing device may identify one or more regions on the computing device. The computing device may determine which of the regions corresponds to a location of the contact based at least in part on the rotational data. The computing device may enable a type of user input corresponding to the determined region.

The computing device may receive sensor data relating to movement of the computing device. In some aspects, the sensor data includes at least one of rotational data, head position data, linear acceleration data and audio data as different types of sensor data. Each type of the sensor data may be captured by a respective sensory element of the computing device. The computing device may correlate each type of the sensor data to determine a location of the first tap and the second tap on the surface of the computing device.

The computing device may determine an expected linear acceleration dataset for a particular contact on the surface of the computing device. In some aspects, the expected linear acceleration dataset includes predetermined linear acceleration values estimated over time. The computing device may determine a distance value computation based at least in part on the expected linear acceleration dataset and an actual linear acceleration dataset associated with the contact. The actual linear acceleration dataset may be captured by at least one device sensor of the computing device. In some aspects, the actual linear acceleration dataset includes measured linear acceleration values over time. The computing device may determine a mean computation over distance value computations. For each tap of the double tap gesture, the computing device may determine that a difference between a current distance value and the mean computation is less than a specified distance threshold. In this respect, the user input may be identified in response to the difference being less than the specified distance threshold. In an aspect, the motion metric includes an indication of the determined difference in distance values.

Figure 10:
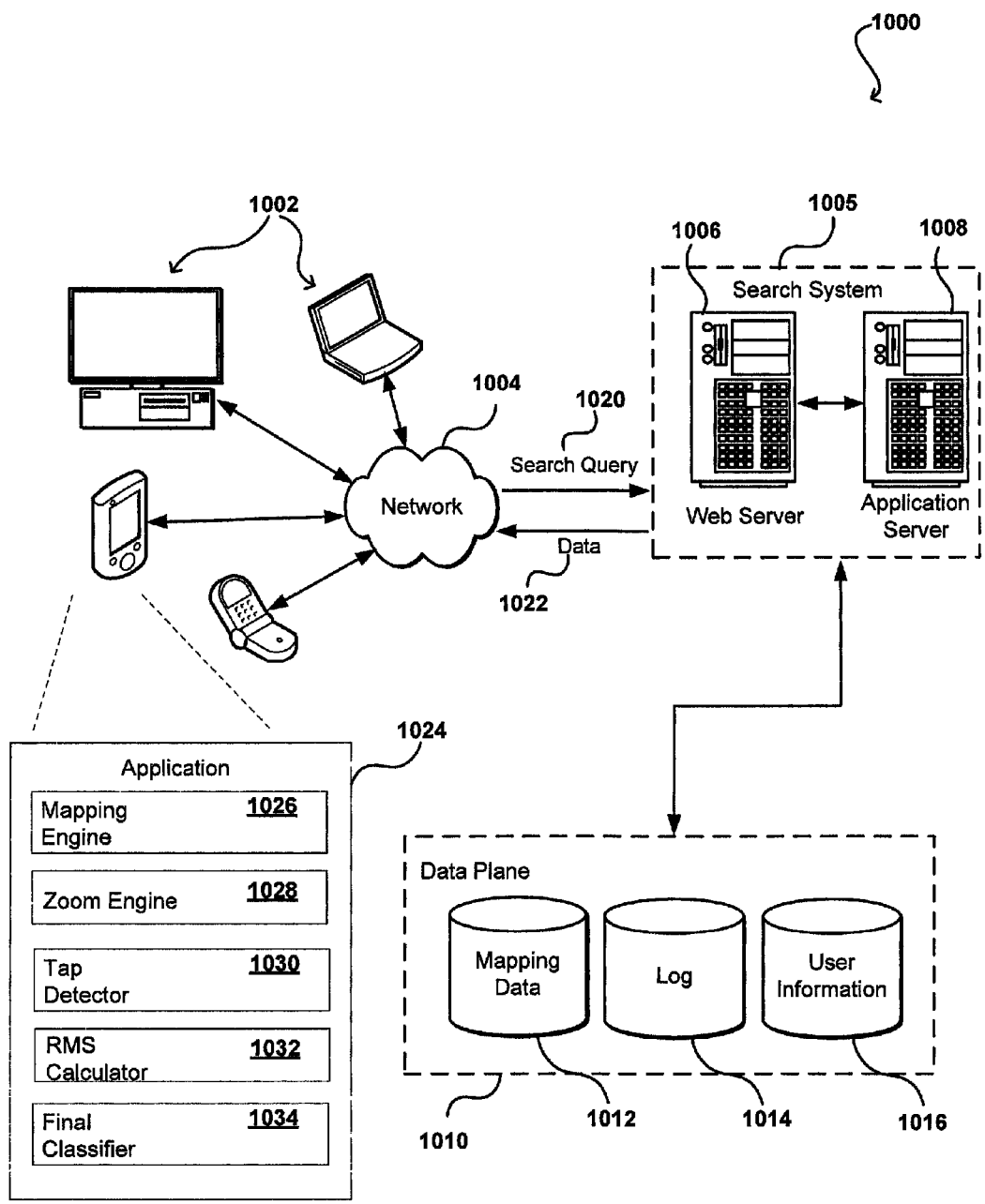
FIG. 10 illustrates an example of an environment for implementing aspects, according to certain aspects of the subject technology.

FIG. 10 illustrates an example of an environment 1000 for implementing aspects in accordance with various embodiments. Although a web-based environment is described for purposes of explanation, different environments may be used, as appropriate, to implement various embodiments.

The example environment 1000 includes a search system 1005 and a data plane 1010. The search system 1005 includes at least one web server 1006 and at least one server 1008, as described below. The search system 1005 is an example of an interactive geographic retrieval system implemented as computer programs on one or more computers in one or more locations, in which the systems, components, and techniques described below can be implemented.

A user can interact with the search system 1005 through a client device 1002. For example, the client device 1002 can be a computer coupled to the search system 1005 through a data communication network 1004, e.g., the Internet. In some instances, the search system 1005 can be implemented on the client device 1002, for example, through a software application executing on the client device 1002. The client device 1002 generally includes a memory, e.g., a random access memory (RAM), for storing instructions and data, and a processor for executing stored instructions. The client device 1002 can be any appropriate device operable to send and receive requests, messages, or other types of information over the network 1004. The client device 1002 can also include a display screen though which a user interacting with the client device can view information, e.g., interactive geographic maps. Some examples of client devices include personal computers, cellular phones, handheld messaging devices, laptop computers, set-top boxes, personal data assistants, electronic book readers, tablet devices, and the like.

The network 1004 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The client device 1002 can communicate over the network using wired or wireless connections, and combinations thereof.

A user can use the client device 1002 to submit a search query 1020 to the search system 1005. The search query 1020 can request an interactive geographic map for a particular geographic region that is identified by a geographic address, e.g., a street address, city, state, zip code, geographic coordinates, or a name of a point of interest. When the user submits the search query 1020, the query 1020 may be transmitted through the network 1004 to a server 1008 within the search system 1005. The server 1008 responds to the query 1020 by using, for example, the mapping data 1012, to identify data 1022 describing a geographic region that satisfies the search query 1020. The server 1008 sends the data 1022 through the network 1004 to the client device 1002 for presentation to the user.

The data 1022 can include data describing a particular geographic region. The data 1022 can be used, for example, by a client device 1002, to generate an interactive map at a specified zoom level that provides a visual, e.g., two-dimensional or three-dimensional, representation of the particular geographic region.

After receiving the data 1022 from the server 1008, and through the network 1004, a software application, e.g., web browser or application 1024, running on the client device 1002 renders an interactive geographic map for the requested geographic region using the data 1022. For example, a mapping engine 1026 in the application 1024 can describe the requested geographic region, for display on a display screen of the client device 1002.

In some embodiments, the mapping application 1024 includes a zoom engine 1028 that is configured to render an interactive mapping system using a zoom mode. In some embodiments, the zoom engine 1028 is configured to determine when the zoom mode has been invoked, for example, using a double tap gesture and performing head tracking techniques, as described in the subject disclosure. Once the zoom mode has been initiated by a valid double tap gesture, the zoom engine 1028 can generate a different zoom view of the interactive map by adjusting the zoom levels included in the interactive geographic map.

In some aspects, the application 1024 includes a tap detector 1030 for determining whether the computed jerk RMS value is above a minimum threshold within a certain range of time to be detected as a tap gesture. The application 1024 can include an RMS calculator 1032 for calculating RMS values for a particular axis of rotational data, and compute a jerk RMS value based on a specified number of jerk samples. The application 1024 can include a final classifier 1034 for performing a symmetry check and/or a head position check to reject possible false positives and identify a valid double tap gesture.

In some embodiments, the web server 1006, server 1008, and similar components, can be considered to be part of the data plane 1010. The handling of all requests and responses, as well as the delivery of content between the client device 1002 and the server 1008, can be handled by the web server 1006. The web server 1006 and server 1008 are merely example components. However, more or fewer components can be used as structured code can be executed on any appropriate device or host machine as discussed elsewhere herein.

The data plane 1010 includes one or more resources, servers, hosts, instances, routers, switches, data stores, other similar components, or a combination thereof. The resources of the data plane 1010 are not limited to storing and providing access to data. Indeed, there may be several servers, layers, or other elements, processes, or components, which may be chained or otherwise configured, and which can interact to perform tasks including, for example, obtaining data from an appropriate data store. In some embodiments, the term "data store" refers to any device or combination of devices capable of storing, accessing, and retrieving data, which may include any combination and number of data servers, databases, data storage devices, and data storage media, in any standard, distributed, or clustered environment.

The data stores of the data plane 1010 can include several separate data tables, databases, or other data storage mechanisms and media for storing data relating to a particular aspect. For example, the data plane 1010 illustrated includes mechanisms for storing geographic data 1012 and user information 1016, which can be used to serve content. The data plane 1010 is also shown to include a mechanism for storing log data 1014, which can be used for purposes such as reporting and analysis. The data plane 1010 is operable, through logic associated therewith, to receive instructions from the server 1008 and to obtain, update, or otherwise process data, instructions, or other such information in response thereto, as described above.

Each server typically includes an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment including several computer systems and components that are interconnected through one or more communication links, using one or more computer networks or direct connections. However, the system described above can be configured to operate equally well using fewer or a greater number of components than are illustrated in FIG. 10. Thus, the system 1000 in FIG. 10 is provided merely as one example, and does not limit the scope of the disclosure.

FIGS. 11A-E illustrate an example approach for detecting and locating an object using a computing device, e.g., the computing device 104.

Figure 11A:
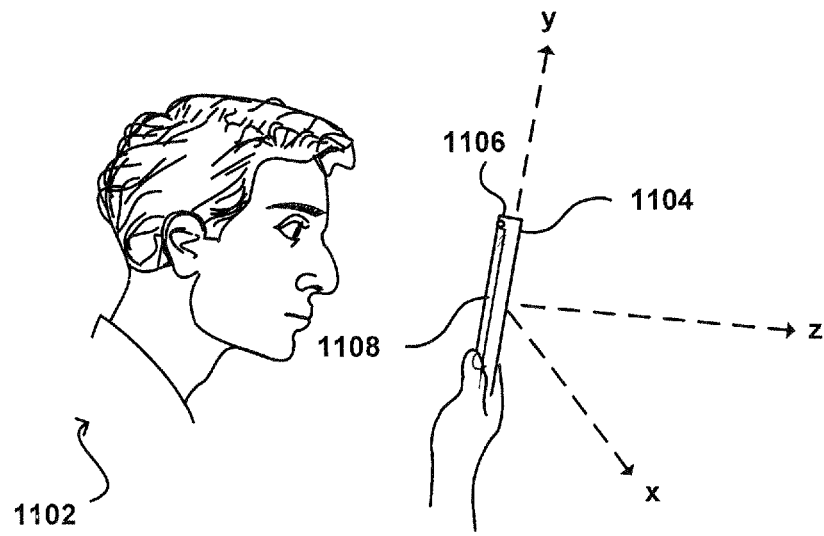
FIGS. 11A-11E illustrate example approaches for detecting and locating an object using a computing device, according to certain aspects of the subject technology.

In FIG. 11A, a user 1102 is shown viewing a display screen 1108 of the computing device 1104, e.g., the computing device 104, as described in reference to FIG. 1. The computing device 1104 includes at least one imaging element, e.g., a camera 1106.

In the example of FIG. 11A, the camera 1106 is located on the front of the computing device 1104. However, the cameras need not be placed in any particular position relative to the computing device 1104 to perform the operations described in this specification. For example, in some instances, the computing device 1104 may include a first camera on the front of the computing device 1104 that is configured to detect and track objects that are positioned in front of the computing device 1104 and second camera on the back of the computing device 1104 that is configured to detect and track objects that are positioned in the back of the computing device 1104. In another example, the computing device 1104 can have the first camera and the second camera on the front of the computing device 1104. In this example, the first and second cameras can be used in combination to detect and track objects, e.g., using epipolar geometric techniques, as described below.

The computing device 1104 can include other types of imaging elements including, for example, ambient light sensors and Infrared (IR) sensors. The computing device 1104 can also include various sensors that are configured to determine a motion, or orientation, of the computing device 1104. For example, the computing device 1104 can include an IMU unit that includes various sensors, e.g., accelerometers, gyroscopes, magnetometers, inclinometers, proximity sensors, distance sensors, depth sensors, range finders, and ultrasonic transceivers.

For example, a software application executing on the computing device 1104 can be configured to detect and track objects that are in an image plane of the computing device 1104 using, for example, one or more computer vision algorithms. The image plane is defined by a field of view that is observable by the camera 1106 of the computing device 1104 based on the position of the computing device. Thus, as the position of the computing device 1104 changes, so does the image plane. Naturally, as the computing device 1104 is moved, the positions of objects in the image plane will change with respect to the movement of the computing device 1104.

Figure 11B:
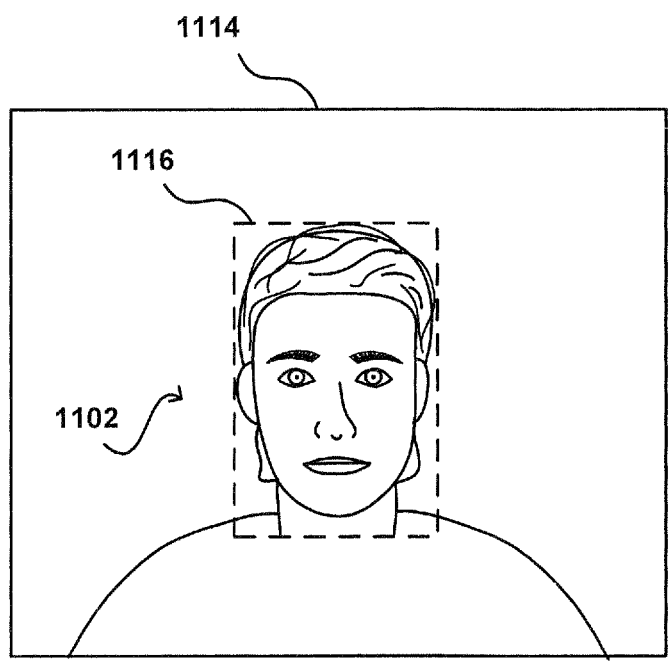

FIG. 11B shows an image 1114 of the user 1102 that was captured using the camera 1106 of the computing device 1104. The user 1102 is shown being positioned in front of the display screen 1108 of the computing device 1104.

Depending on the embodiment, when initially detecting and tracking the user 1102, a threshold number of images of the user 1102 may be captured using the camera 1106 at different time intervals. In some embodiments, the time intervals vary based on the application for which an object is being tracked. For example, in applications that require a higher frame rate, e.g., games, the object may be tracked between image frames more frequently.

Once the image 1114 is captured, the computing device 1104 evaluates the image 1114 using one or more computer vision algorithms, e.g., face detection algorithms, to identify the user 1102. For example, the user 1102 can be identified by determining a location of the face of the user 1102 in the image 1114 and evaluating the characteristics of the face. The location of the face can be described using, for example, a bounding box 1116 that defines the boundaries of the face.

In some embodiments, the computing device 104 is configured to generate an object model that describes the features of the object being tracked. For example, when generating an object model of a face, the computing device 104 can apply generally known algorithms to determine a three-dimensional geometry of the face, for example, by identifying facial features, e.g., nose, eyes, eyebrows, and lips. The facial geometry can be used to detect and track the face in subsequent images. The face can be detected and tracked between a first and second image, for example, by measuring a similarity, e.g., normalized cross-correlation, of the facial geometry in the first frame and the facial geometry in the second frame.

Depending on the embodiment, other types of generally known object detection algorithms or classifiers can be used to identify respective objects including, for example, human heads, human faces, human eyes, and human nose.

Figure 11C:
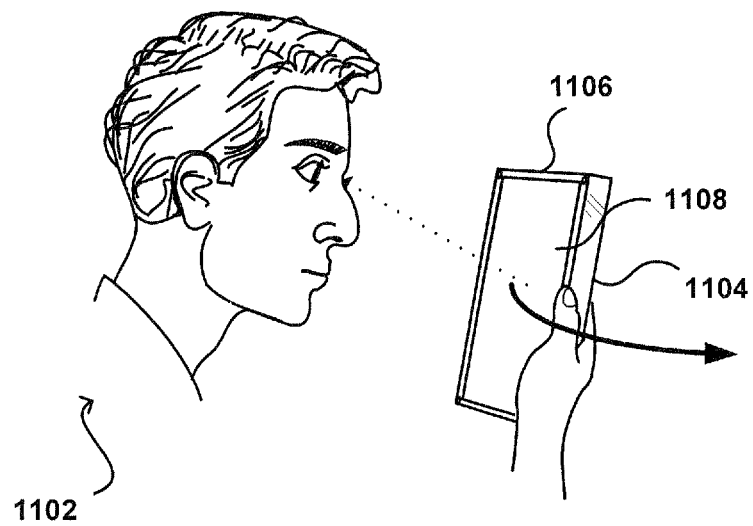

FIG. 11C shows the user 1102 viewing the display screen 1108 of the computing device 1104, e.g., the computing device 104, as described in reference to FIG. 1. In FIG. 11C, the user 1102 has rotated the computing device 1104 to the right with respect to the user's 1102 perspective. By rotating the computing device 1104, image plane that is observable to the camera 1106 has changed and, as a result, the position of the user 1102 in the image plane has also changed with respect to the movement of the computing device 1104. The computing device 1104 can capture one or more new images of the user 1102 and can use one or more computer vision algorithms, as described above, to detect and track the user 1102 in the image plane, as described in reference to FIG. 11D.

Figure 11D:
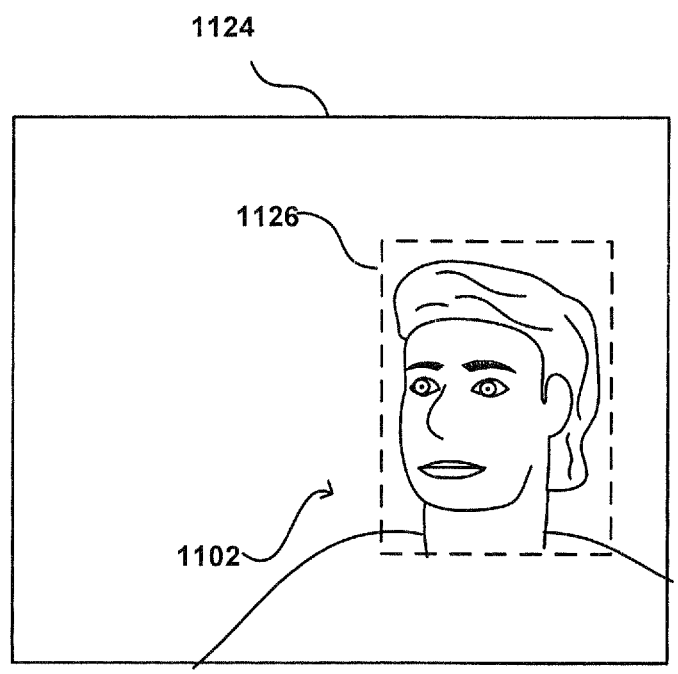

FIG. 11D shows an image 1124 of the user 1102 that was captured using the camera 1106 of the computing device 1104 in response to the movement of the computing device 1102, as described in reference to FIG. 11C. The user 1102 is shown in a different position that has changed with respect to the movement of the computing device 1104.

Figure 11E:
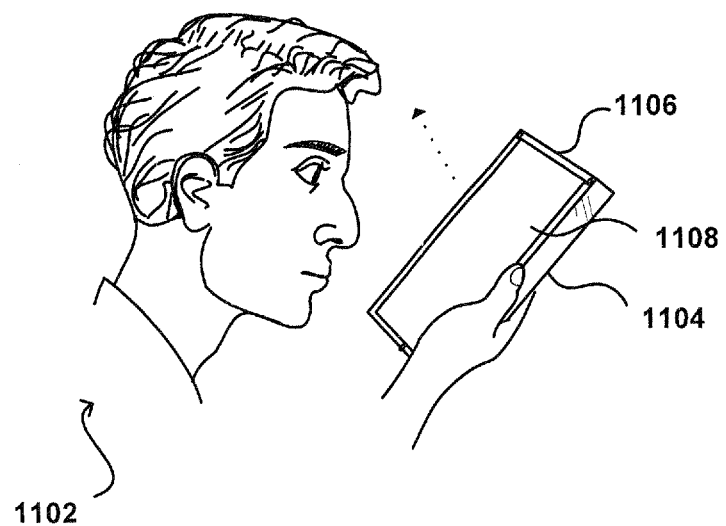

FIG. 11E shows the user 1102 viewing the display screen 1108 of the computing device 1104, e.g., the computing device 104, as described in reference to FIG. 1.

In FIG. 11E, the user 1102 has tilted the computing device 1104 away from the user's face. As a result of the tilting, the image plane that is observable to the camera 1106 has changed and, consequently, the position of the user in the image plane will also change with respect to the movement of the computing device 1104. In various embodiments, the user can tilt a relative orientation of the device 1102 with respect to the user, for example, by a threshold number of degrees, to modify a displayed geographic map, as described above.

For example, the map can be modified by showing different types of information, e.g., displaying traffic information, in the map or the map can be modified by changing certain aspects of the map, e.g., changing the text size of map labels shown in the map, in response to the tilting. Naturally, the computing device 1104 can be configured so that tilting the computing device 1104 toward the user 1102 returns the displayed map to its original state before tilting or modifies the displayed map in a different to show different types of information in the map or to change different aspects of the map.

The computing device 1104 can apply computer vision algorithms to the image 1124, as described above, to detect and track the user 1102 in the image 1124. Based on the detection and tracking, the bounding box 1126, which identifies a location of the face of the user 1102, can be redrawn to update the boundaries of the face. The new location of the user 1102 in the image plane can be provided to one or more software applications executing on the computing device 1104 to perform various operations, e.g., augmented reality.

Typically, computing devices are configured to rely exclusively on computer vision algorithms to detect and track an object between images that were captured using a camera of the computing device. For reasons described above, this approach can result in an increased consumption of resources, e.g., power, by the computing device.

To regulate this consumption of resources, in some embodiments, sensors in an IMU are used to track objects in combination with generally known computer vision techniques for object detection and tracking. The use of IMU sensors can be especially appropriate in situations where the object being tracked generally remains stationary with respect to the computing device performing the object detection and tracking.

For example, in such embodiments, once the user 1102 in the image plane has been detected by the computing device 1104 using one or more computer vision techniques, the computing device 1104 can store data describing a position of the user 1102 in the image 1114, as described in reference to FIG. 11A, together with data describing a position of the computing device 1104 in three-dimensional space at the time the image 1114 was captured.

The position of the user 1102 in the image plane can be determined using computer vision techniques, as described above. Further, the position of the computing device 1104 in three-dimensional space can be determined based on data that is obtained from IMU sensors, e.g., gyroscopes and accelerometers. For example, the computing device 1104 can determine a position of the computing device 1104 by double integrating data that is obtained from an accelerometer in the computing device 1104. Additionally, the computing device 1104 can determine a rate of change in the computing device's orientation, i.e., angular acceleration, using data that is obtained from a gyroscope in the computing device 1104. Changes in the angular position of the computing device 1104 can be determined, for example, by integrating the measured angular velocity of the computing device 1104.

At the time the image 1114 is captured, the computing device 1104 can also determine a distance of the user 1102 from the camera 1107 of the computing device 1104. In some embodiments, the distance of the user 1102 from the camera 1107 of the computing device 1104 is determined based on a size of the user 1102 as projected in the image plane. For example, most faces have a size that falls within a certain measurement range. Based on this observation, a predefined real world width of face of the user 1102 can be predefined. The real world width is a specified width that approximates an actual width of the object that is being identified. For example, a real world width for a human face can be approximated at eight inches in width. The real world width of a soda can be specified as three inches in width. The computing device 1104 can determine a projected width of the face of the user 1102, as determined by measuring the face of the user 1102 in the image 1114. The projected width is a width of an object as it appears in an image, for example, in terms of pixels. For example, a human face captured in an image may have a projected width of one hundred pixels. The computing device 1104 can then estimate the distance of the face of the user 1102 based on a comparison of the real world width and the projected width. This distance can be adjusted based on other factors including, for example, the focal length of the lens of the camera 1106.

One example set of equations that can be used to estimate the distance of an object based on a comparison of the real world width and the projected width is reproduced below:

$$PH = f * \left(\frac{AH}{z}\right) \quad \text{(Equation 3)}$$

$$PW = f * \left(\frac{AW}{z}\right) \quad \text{(Equation 4)}$$

where PH is the projected height of the object, where AH is the real world height of the object, where PW is the projected width of the object, where AW is the real world width of the object, where f is the focal length of the camera, and where z is the distance of the object of the object from the camera of the computing device. In some embodiments, the computing device 1104 can determine a distance of the user 1102 using multiple cameras of the computing device 1104 using techniques for measuring disparity, as described in reference to FIGS. 11A-E, 12A-D, and 13A-H.

In some embodiments, when the computing device 1104 is moved from its initial position, as described in reference to FIGS. 11A-B, the computing device 1104 can deactivate computer vision-based tracking of the user 1102 and switch to determining the user's 1102 location using data obtained from the IMU sensors. For example, after the computing device 1104 is moved, the computing device 1104 can determine an updated position of the computing device 1104 in three-dimensional space using the IMU sensors.

The computing device 1104 can determine a change in the computing device's position based on a comparison of the updated position of the computing device 1104 and the position of the computing device 1104 in three-dimensional space at the time the image 1114 was captured. Further, based on the change in the computing device's position, the position of the user 1102 in the image 1114, and the distance of the user 1102 from the camera 1106 of the computing device 1104 at the time the image 1114 was captured, the computing device 1104 can determine an updated position of the user 1102 in three-dimensional space. The computing device 1104 can then project the position of the user 1102 from three-dimensional space to a two-dimensional image plane determine the user's 1102 updated location.

In some embodiments, the computing device 1104 is configured to verify that the updated location of the user in the image plane, as determined using IMU sensors, is accurate. In such embodiments, the computing device 1104 can determine a location of user 1102 using image-based object locating techniques, as described above, and comparing that location with the location of the user 1102 that was determined using the IMU sensors. In some embodiments, the computing device 1104 switches back to using image-based locating techniques to track the user 1102 if the distance between the location determined using image-based object tracking techniques and the location determined using IMU sensors satisfies a specified threshold.

In some embodiments the computing device 1104 can be configured to alternate between image-based object locating techniques and IMU sensor-based object locating techniques. For example, the computing device 1104 can be configured to determine the user's position using IMU sensors at a first time interval, e.g., every 100 milliseconds, and to determine the user's position using image-based object tracking at a second time interval, e.g., every 1 second. The first time interval can occur more frequently to allow less consumption of power by the computing device 1104. The determined locations of the user 1102 using the IMU sensors and the image-based object locating techniques can be compared at certain time intervals, e.g., every time image-based object tracking is used, to ensure that the locations determined by the IMU sensors are accurate. The first and second time intervals can be adjusted based on the accuracy of the IMU sensors. For example, if the locations determined using the IMU sensors are inaccurate, then the computing device 1104 can perform image-based object locating more often. In contrast, if the IMU sensors are accurate, or mostly accurate, then the computing device 1104 can perform image-based object locating less often and IMU sensor-based object locating more often.

In some instances, the use of IMU sensors to determine the user's location may not be feasible due to the circumstances surrounding the movement of the computing device 1104. For example, if the user 1102 is in a moving vehicle, e.g., a train, or a swiveling chair, the use of IMU sensors may result in erroneous tracking predictions. The computing device 1104 can be configured to identify such situations and, in response, rely on image-based object locating techniques to track the user 1102 until the situation has subsided. In some embodiments, the computing device 1104 identifies such situations by evaluating of the image backgrounds of images that were captured by the camera 1107 of the computing device 1104. In instances where there are significant disparities in the image backgrounds, the computing device 1104 switch to relying on image-based object locating techniques to track the user 1102. For example, a significant disparity can arise when the background in a first image contains trees and the background in a second image contains mountains and no trees.

The techniques described in this specification can be used to detect and track other types of objects besides humans. For example, the computing device 1104 can be configured to detect and track a book. When tracking a book, the computing device 1104 can determine, or obtain from a database, a real world size of the book being tracked, and then determine based on the real world size of the book and a projected size of the book, the distance of the book from the camera 1106 of the computing device 1104. This data can be used to track the book using IMU sensors, as described above. The computing device 1104 can use IMU sensors in combination with computer vision techniques in, for example, augmented reality applications without having to rely solely on computationally and power intensive computer vision algorithms.

Figure 12A:
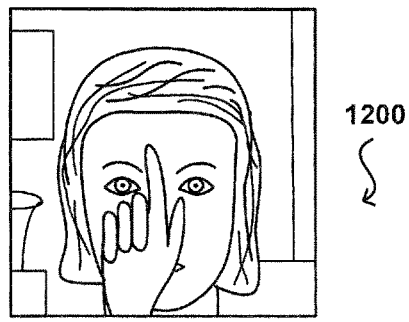
FIGS. 12A-12D illustrate examples of applying stereoscopic image data, according to certain aspects of the subject technology.
Figure 12B:
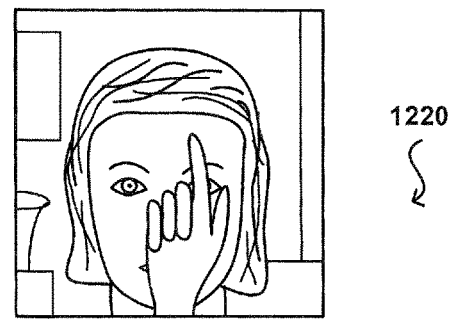

In some embodiments, three-dimensional or stereoscopic image information can be captured using multiple cameras to provide three-dimensional point data, or disparity information that can be used to detect and track objects. For example, FIGS. 12A-D illustrate applying stereoscopic image data in accordance with various embodiments. For example, FIGS. 12A and 12B illustrate images 1200 and 1220 that can be captured using a pair of cameras, e.g., stereoscopic cameras that are in a computing device, e.g., the computing device 100 (FIG. 1). In various embodiments, a pair of cameras may capture images simultaneously or in close proximity to one another. As a result, the captured images would include at least some matching points of interest. For example, a user's finger, nose, eyes, eyebrows, lips, or other features may be detected or tracked by the computing device in both images by using the various techniques discussed elsewhere herein.

Figure 12C:

FIG. 12C illustrates an example combination image 1240 showing the relative position of various objects in the captured images 1200 and 1220 if those images were "overlaid" or "superimposed." This illustrates the amount of disparity, or lateral offset, between objects in the captured images. Objects in the images that are closer to the device, e.g., the finger, have relatively large amounts of disparity. Objects in the images that are further away from the device, e.g., the painting on the wall, have relatively small amounts of disparity. Objects in the images that are between these two areas will have intermediate amounts of disparity based upon the relative distance of those objects from the cameras.

Figure 12D:
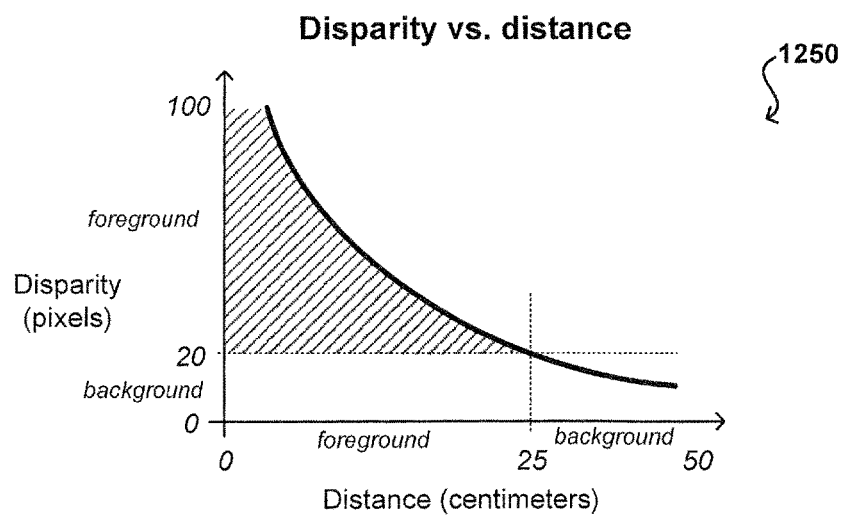

FIG. 12D illustrates an example plot 1250 showing a relationship of disparity with respect to distance. As illustrated, the amount of disparity is inversely proportional to the distance from the cameras, such that there can be significantly more disparity in the near camera field, e.g., 0 to 1.0 m, than in the far field, e.g., 1.0 m to infinity. Further, the decrease is not linear. However, objects decrease more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 1250 or relationship, the computing device, or an application or user of the device, can determine that the amount of disparity at fifty centimeters for the configuration parameters of the current device, e.g., camera resolution, camera separation, or field of view is twenty five pixels of separation between images. Using this information, the device can analyze matching feature points, e.g., nose, eyes, or fingertips, in the stereo images, and determine the approximate distance between those feature points and the computing device. For example, the amount of disparity, D, at a given distance, z, can be represented by the relationship:

$$D = \frac{f * B}{z} \qquad \text{(Equation 5)}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device. Various other approaches can be utilized as well as should be apparent to one of ordinary skill in the art in light of the teachings and suggestions contained herein. For example, other approaches for determining a distance between an object of interest and the device can include using time-of-flight cameras or structured light cameras. A time-of-flight camera is a range imaging camera system that determines a distance of an object from the camera based on the known speed of light. For example, the camera can measure the time-of-flight of a light signal between the camera and the object for each point of an image of the object. A structured light camera is a three-dimensional scanning device used for measuring the three-dimensional shape of an object using projected light patterns and a camera.

Figure 13A:
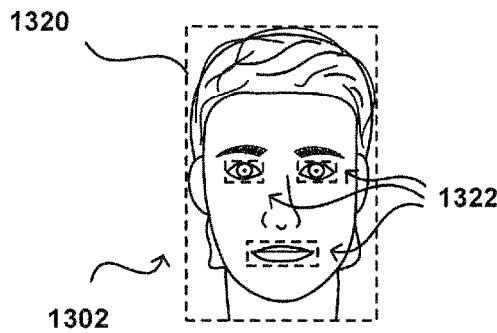
FIG. 13A-13H illustrate examples of tracking a user of the computing device, according to certain aspects of the subject technology.

FIG. 13A illustrates an example wherein the approximate position and orientation of the head of a user 1302 has been determined and a virtual "box" 1320 is placed around the user's head using one or more of the various user detection processes discussed herein. A similar or different approach can also be used to determine an approximate location and area 1322 of each of the user's face, eyes, mouth, or other facial features. Further, the relative movement of the user's eyes and mouth can be easier to detect than the overall movement of the user's face when the user is performing motions such as nodding or shaking the head back and forth.

Figure 13B:
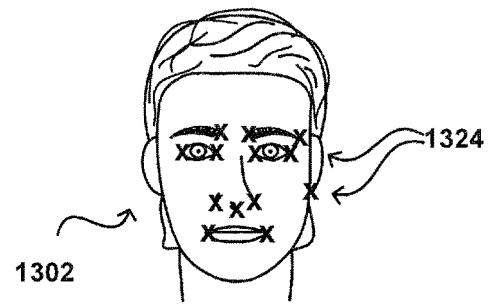

Various other approaches can also be used to detect and track the user. For example, FIG. 13B illustrates an example wherein various features on a user's face are identified and assigned a point 1324 in the image. The system thus can detect various aspects of user facial features and can determine changes such as movement or change in shape or expression. Such an approach can provide advantages over the general approach of FIG. 13A in certain situations, as various points along a facial feature can be determined, such as the end points and at least one center point of a user's mouth. Accordingly, expressions such as a smile or frown can be captured even though the overall position of the user's mouth or face did not move. Once the facial features of a user are detected, relative motion or changes in facial expression can be tracked and utilized as input in accordance with various embodiments.

Figure 13C:
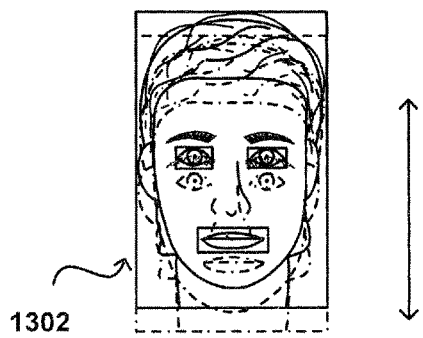

For example, FIG. 13C illustrates an example where the user's head 1302 is moving up and down with respect to the field of view of the imaging element. For example, this could be the result of the user shaking his or her head, or the user moving the device up and down.

Figure 13D:
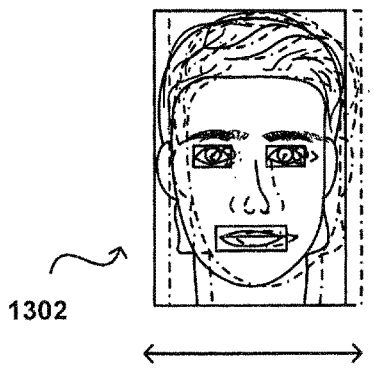

FIG. 13D illustrates a similar example where the user is moving right to left relative to the device, through movement of the user, the device, or both. As can be seen, each movement can be tracked as a vertical or horizontal movement, respectively, and each can be treated differently as an input to perform a specified function. As should be understood, various embodiments also can detect diagonal or other such movements.

Figure 13E:
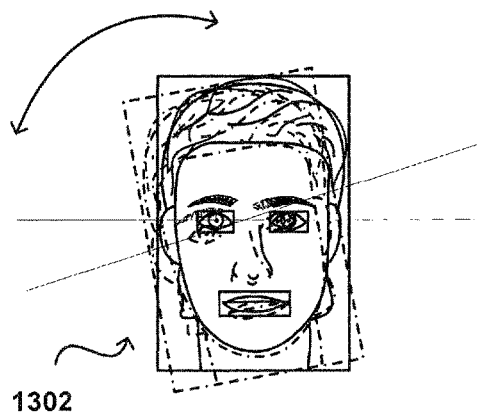

FIG. 13E further illustrates an example wherein the user tilts the device or the user's head, and the relative change in eye position is detected as a rotation. In some systems, a "line" that corresponds to the relative position of the eyes (or other facial features such as eyebrows, hairline, mouth, chin, ears, etc.) can be monitored, and a shift in angle of this line can be compared to an angle threshold to determine when the rotation should be interpreted as input.

Figure 13F:
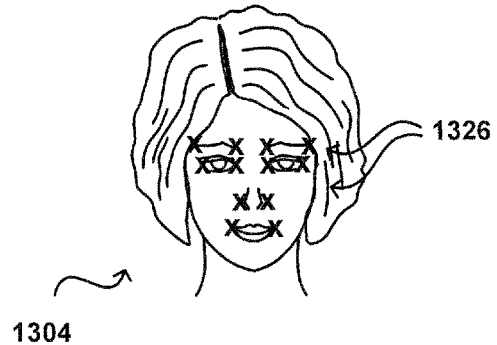

FIG. 13F illustrates another advantage of using an approach to determine the position of various features on a user's face. In this example, it can be seen that the features of a head of a second user 1304 have a different relative position and separation. Thus, a computing device also can not only determine positions and changes of facial features for a specific user, but can distinguish between different users. Also, the device can be configured to detect how close a user is to the device based on, for example, the amount and ratio of separation of various features, such that the device can detect movement towards, and away from, the device. This can help to improve the accuracy of facial tracking.

Figure 13G:
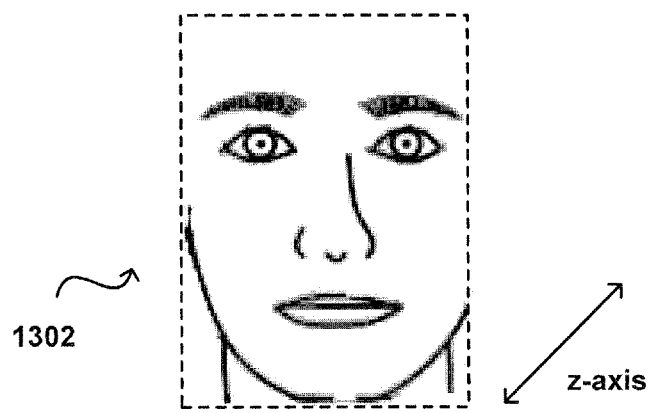

For example, FIG. 13G illustrates an example where the distance between the user's head 1302 and the computing device has been reduced. For example, this could be the result of the user bringing the user's head 1320 closer to a display screen of the computing device along the z-axis.

Figure 13H:
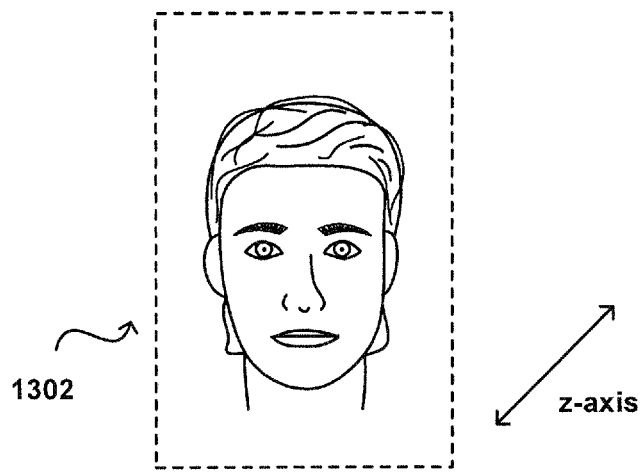

For example, FIG. 13H illustrates an example where the distance between the user's head 1302 and the computing device has been increased. For example, this could be the result of the user moving the user's head 1320 further away from the display screen of the computing device.

Figure 14:
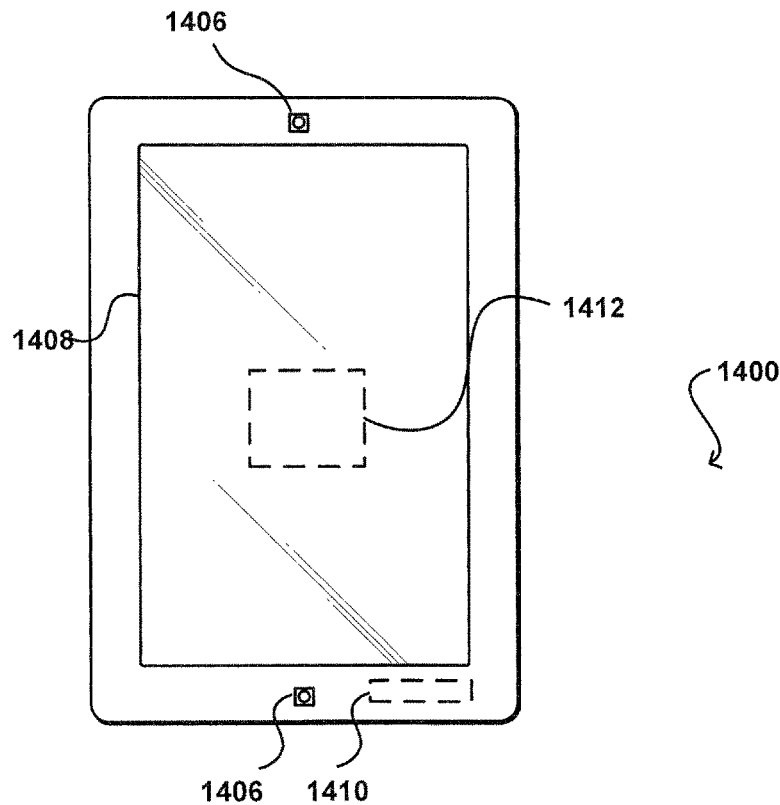
FIG. 14 illustrates an example computing device, according to certain aspects of the subject technology.

FIG. 14 illustrates an example computing device 1400 that can be used to perform approaches described in accordance with various embodiments. In this example, the device includes two image capturing components 1406 located at the top and bottom of a front face of the device and on the same surface as the display element 1408, and enabling the device to capture images in accordance with various embodiments, such as images of a user viewing the display element and/or operating the device. The computing device includes audio input element 1410, such as a microphone, to receive audio input from a user. In some embodiments, the audio data can be used in conjunction with other approaches to estimate the pose of the user. The computing device also includes an inertial measurement unit (IMU) 1412, including a three-axis gyroscope, three-axis accelerometer, and magnetometer, that can be used to detect the motion of the device, from which position and/or orientation information can be derived.

Figure 15:
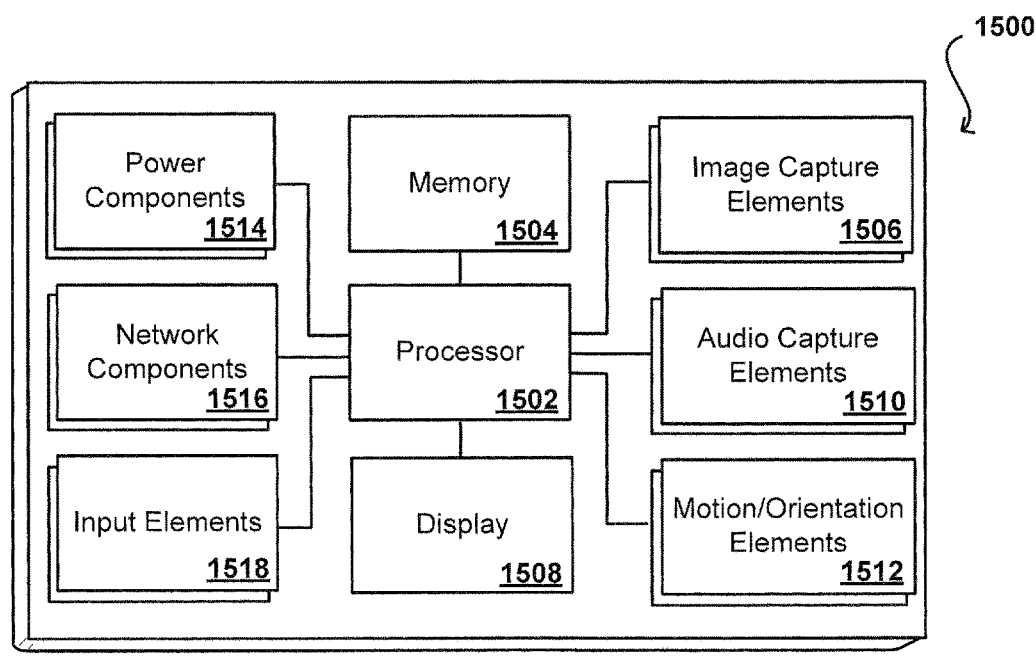
FIG. 15 illustrates an example configuration of components of a computing device, according to certain aspects of the subject technology.

FIG. 15 illustrates a logical arrangement of a set of general components of an example computing device 1500. In this example, the device includes a processor 1502 for executing instructions that can be stored in a memory device or element 1504. As would be apparent to one of ordinary skill in the art, the device can include many types of memory, data storage, or non-transitory computer-readable storage media, such as a first data storage for program instructions for execution by the processor 1502, a separate storage for images or data, a removable memory for sharing information with other devices, etc. The device typically will include some type of display element 1506, such as a touch screen or liquid crystal display (LCD), although devices such as portable media players might convey information via other means, such as through audio speakers. As discussed, the device in many embodiments will include at least one image capture element 1508 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 1510, such as a mono or stereo microphone or microphone array, operable to capture audio information from at least one primary direction. A microphone can be a uni- or omni-directional microphone as known for such devices.

In some embodiments, the computing device 1500 of FIG. 15 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1500 also can include at least one orientation or motion sensor 1512. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as elements that enable location determinations through triangulation or another such approach. These mechanisms can communicate with the processor 1502, whereby the device can perform any of a number of actions described or suggested herein.

As an example, a computing device can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
    a device housing;
    at least one touchscreen display;
    at least one rotational motion sensor internal to the computing device, between the device housing and the at least one touchscreen display;
    at least one processor; and
    at least one memory device storing instructions that, when executed by the at least one processor, cause the computing device to:
        display content within a first region of the at least one touchscreen display;
        receive first sensor data, from the at least one rotational motion sensor, representing a first rotational motion of the computing device occurring within a first time period;
        receive second sensor data, from the at least one rotational motion sensor, representing a second rotational motion of the computing device occurring within a second time period after the first time period;
        determine a first amount of force applied to a second region of the device housing opposing the first region occurring within the first time period;
        determine a second amount of force applied to the second region occurring within the second time period;
        determine, from the first sensor data, a first rotational axis associated with the first rotational motion;
        determine, from the second sensor data, a second rotational axis associated with the second rotational motion;
        determine that a number of degrees of difference between the first rotational axis and the second rotational axis satisfies a first symmetry threshold;
        determine that a difference in magnitude between the first amount of force and the second amount of force satisfies a second symmetry threshold;
        determine that the computing device has received a selection of the content as a double tap based at least in part on the number of degrees of difference satisfying the first symmetry threshold and the difference in magnitude satisfying the second symmetry threshold; and
        perform an action on the computing device corresponding to the selection of the content.

2. The computing device of claim 1, wherein the instructions upon being executed further cause the computing device to:
    determine at least one jerk sample based at least in part on a rate of change computation of at least one rotational acceleration value of the first sensor data for at least one axis corresponding to the computing device; and
    determine the first amount of force based at least in part on a quadratic mean computation for the at least one jerk sample.

3. A method comprising:
    displaying content within a first region of at least one display screen of a computing device;
    detecting a first device motion occurring within a first time period;
    detecting a second device motion occurring within a second time period after the first time period;
    determining a first amount of force applied to a second region of the computing device opposing the first region occurring within the first time period;
    determining a second amount of force applied to the second region occurring within the second time period;
    determining that a first rotational axis associated with the first device motion is within a range of angular degrees from a second rotational axis associated with the second device motion;
    determining that the first amount of force is within a range of magnitudes of the second amount of force;
    determining that the computing device has received a selection of the content as a double tap based at least in part on the first device motion being within the range of angular degrees from the second rotational axis and the first amount of force being within the range of magnitudes of the second amount of force; and
    performing an action on the computing device corresponding to the selection of the content.

4. The method of claim 3, further comprising:
    receiving rotational data from at least one device sensor of the computing device, wherein the rotational data includes a plurality of rotational acceleration values;
    determining at least one jerk sample based at least in part on a second derivative computation of at least one of the rotational acceleration values for at least one axis corresponding to the computing device; and
    determining the first amount of force based at least in part on a quadratic mean computation for the at least one jerk sample.

5. The method of claim 3, further comprising:
    determining a range of quadratic mean computations corresponding to the second device motion;
    determining that a length of time associated with the range of quadratic mean computations is greater than a first time threshold; and
    determining that the length of time is smaller than a second time threshold, the second time threshold being greater than the first time threshold, wherein the length of time is bounded by the first time threshold and the second time threshold.

6. The method of claim 3, further comprising:
    determining that the first device motion corresponds to a first tap;
    determining that the second device motion corresponds to a second tap; and
    determining that the first tap and the second tap correspond to the double tap gesture associated with the selection of the content.

7. The method of claim 3, further comprising:
    determining that the first device motion corresponds to a first tap to the second region; and
    determining that the second device motion corresponds to a second tap to the second region.

8. The method of claim 3, further comprising:
determining the second region as a quadrant of a back outer surface of a device housing of the computing device.

9. A computing device, comprising:
at least one display screen;
at least one processor; and
memory storing instructions that, upon being executed by the at least one processor, cause the computing device to:
display content within a first region of the at least one display screen;
detect a first rotational motion occurring within a first time period;
detect a second rotational motion occurring within a second time period after the first time period;
determine a first amount of force applied to a second region of the computing device opposing the first region occurring within the first time period;
determine a first rotational axis associated with the first rotational motion;
determine a second amount of force applied to the second region occurring within the second time period;
determine a second rotational axis associated with the second rotational motion;
determine that the first rotational axis and the second rotational axis are within a range of angular degrees of each other;
determine that the first amount of force and the second amount of force are within a range of magnitudes of each other;
determine that the computing device has received a selection of the content as a double tap based at least in part on the first rotational motion and the second rotational motion being within the range of angular degrees of each other and the first amount of force and the second amount of force being within the range of magnitudes of each of other; and
perform an action on the computing device corresponding to the selection of the content.

10. The computing device of claim 9, wherein the instructions further cause the computing device to:
receive rotational data from at least one device sensor of the computing device, wherein the rotational data includes a plurality of rotational acceleration values;
determine at least one jerk sample based at least in part on a second derivative computation of the at least one of the rotational acceleration values for at least one axis corresponding to the computing device; and
determine the first amount of force based at least in part on a quadratic mean computation over the at least one jerk sample.

11. The computing device of claim 9, wherein the instructions upon being executed further cause the computing device to:
determine a range of quadratic mean computations corresponding to the second rotational motion;
determine that a length of time associated with the range of quadratic mean computations is greater than a first time threshold; and
determine that the length of time is smaller than a second time threshold, the second time threshold being greater than the first time threshold,
wherein the length of time is bounded by the first time threshold and the second time threshold.

12. The computing device of claim 9, wherein the instructions upon being executed further cause the computing device to:
determine that the first rotational motion corresponds to a first tap;
determine that the second rotational motion corresponds to a second tap; and
determining that the first tap and the second tap correspond to a double tap gesture associated with the selection of the content.

13. The computing device of claim 9, wherein the instructions upon being executed further cause the computing device to:
determine that the first rotational motion corresponds to a first tap to the second region; and
determine that the second rotational motion corresponds to a second tap to the second region.

14. The computing device of claim 1, further comprising a second sensor, wherein the instructions upon being executed further cause the computing device to:
capture third sensor data within the first time period using the second sensor;
capture fourth sensor data within the second time period using the second sensor; and
analyze the third sensor data and the fourth sensor data to determine that the selection of the content was intentional.

15. The computing device of claim 1, wherein the instructions upon being executed further cause the computing device to:
determine that the first rotational motion corresponds to a first tap;
determine that the second rotational motion corresponds to a second tap; and
determine that the first tap and the second tap correspond to a double tap gesture associated with the selection of the content.

16. The computing device of claim 1, wherein the instructions upon being executed further cause the computing device to:
determine that the first rotational motion corresponds to a first tap to the second region; and
determine that the second rotational motion corresponds to a second tap to the second region.

17. The method of claim 3, further comprising:
capturing first sensor data within the first time period;
capturing second sensor data within the second time period; and
analyzing the first sensor data and the second sensor data to determine that the selection was intentional.

18. The computing device of claim 9, wherein the instructions upon being executed further cause the computing device to:
capture first sensor data within the first time period;
capture second sensor data within the second time period; and
analyze the first sensor data and the second sensor data to determine that the selection of the content was intentional.

19. The computing device of claim 9, wherein the instructions upon being executed further cause the computing device to:
determine the second region as a quadrant of a back outer surface of a device housing of the computing device.

* * * * *